US012125253B2

(12) United States Patent
Robertson et al.

(10) Patent No.: US 12,125,253 B2
(45) Date of Patent: Oct. 22, 2024

(54) COMPOSITE IMAGE CREATION FOR AERIAL IMAGE CAPTURE SYSTEM

(71) Applicant: URBAN SKY

(72) Inventors: Mark Robertson, Cupertino, CA (US); Jared Leidich, Denver, CO (US); Maxmillion J. W. McLaughlin, Fort Myers, FL (US)

(73) Assignee: URBAN SKY THEORY INC., Denver, CO (US)

( * ) Notice: Subject to any disclaimer, the term of this patent is extended or adjusted under 35 U.S.C. 154(b) by 91 days.

(21) Appl. No.: 18/171,226

(22) Filed: Feb. 17, 2023

(65) Prior Publication Data

US 2023/0206580 A1  Jun. 29, 2023

Related U.S. Application Data

(63) Continuation-in-part of application No. 17/586,559, filed on Jan. 27, 2022, now Pat. No. 11,601,599.
(60) Provisional application No. 63/164,288, filed on Mar. 22, 2021.

(51) Int. Cl.
| | | |
|---|---|---|
| *G06V 10/10* | (2022.01) | |
| *G06T 3/4038* | (2024.01) | |
| *G06T 7/10* | (2017.01) | |
| *G06V 10/26* | (2022.01) | |
| *G06V 10/62* | (2022.01) | |
| *G06V 20/10* | (2022.01) | |

(52) U.S. Cl.
CPC ............ *G06V 10/16* (2022.01); *G06T 3/4038* (2013.01); *G06T 7/10* (2017.01); *G06V 10/273* (2022.01); *G06V 10/62* (2022.01); *G06V 20/10* (2022.01); *G06T 2207/10032* (2013.01); *G06T 2207/20132* (2013.01); *G06T 2207/30181* (2013.01)

(58) Field of Classification Search
CPC ...... G06V 10/16; G06V 10/273; G06V 10/46; G06V 10/62; G06T 2207/10032; G06T 2207/20132; G06T 2207/30181; G06T 3/4038
See application file for complete search history.

(56) References Cited

U.S. PATENT DOCUMENTS

| | | | |
|---|---|---|---|
| 9,374,561 B1 * | 6/2016 | Reece | G05D 1/0094 |
| 2017/0248421 A1 * | 8/2017 | Cope | G01S 19/51 |
| 2021/0129987 A1 * | 5/2021 | Foong | B64U 20/87 |

* cited by examiner

*Primary Examiner* — Kathleen V Nguyen
(74) *Attorney, Agent, or Firm* — HOLZER PATEL DRENNAN

(57) ABSTRACT

A method for creating a composite image includes receiving a group of images indexed according to a time-consecutive capture sequence. Each image is evaluated for inclusion in the composite image, and the evaluation of each image entails determining whether a spatial footprint of the image is entirely internal to a polygon formed based on a union of spatial footprints corresponding to images positioned on a same side of the image within the time-consecutive capture sequence. If the spatial footprint of the image is not entirely internal to the polygon, an identifier for the image is added to a composite image array. Otherwise, the identifier for the image is excluded from the composite image array. After all images have been evaluated, the composite image is created by stitching together images with respective identifiers included in the composite image array.

20 Claims, 21 Drawing Sheets

COMPOSITE IMAGE CREATION FOR AERIAL IMAGE CAPTURE SYSTEM

CROSS REFERENCE TO RELATED APPLICATIONS

The present application claims priority to U.S. Provisional Patent Application No. 63/164,288, titled Sinucircular Mechanism and Data Capture Method for Remote Sensing Balloons, and filed on Mar. 22, 2021, is a continuation-in-part of U.S. patent Ser. No. 17/586,559, filed on Jan. 17, 2022 and titled "Aerial Image Capture System with Single Axis Camera Rotation," both of which are hereby incorporated by reference for all that they disclose or teach.

BACKGROUND

High-Altitude Balloons are useful platforms for applications like atmospheric sampling, celestial imaging, and communications repeating. Due to the high vantage point of the stratosphere, there exists potential for using high-altitude balloons for earth observation and remote sensing applications. Yet, there exist fundamental technological hurdles that typically preclude high-altitude balloons from being used for applications where instruments look down at the earth. These hurdles arise largely from the inability to control balloon system speed and from the lightweight nature of such systems that creates vulnerabilities relating to inertial stability.

The first major problem with using high altitude balloons for earth observation applications is placement. Because high-altitude balloons are pushed by the wind, and most commonly do not have propulsion capabilities, it is very difficult to precisely place a high-altitude balloon over a predetermined point on the ground. Without an ability to place a balloon over a specific point on the ground, applications like earth imaging are minimally useful because a balloon operator is not able to choose exactly what they would be imaging. This problem would be lessened if a wide coverage swath from a high-altitude balloon were possible so as to allow a balloon to be placed near but not directly over its target while still collecting useful data.

Another challenge to remote sensing applications using high altitude balloons is stability. Lighter-than-air balloons typically do not have a large mass moment of inertia and therefore do not command significant inertial stability. Balloons also typically travel at very low airspeeds and so do not command substantial aerodynamic stability. Small balloons are very lightweight and are therefore prone to large changes in attitude as a response to relatively small forces. Without a stable operating platform, remote sensing equipment (such as long focal length lenses capturing highly detailed data) may not be able to collect useful data. While sensing equipment that can be actively angled and gimbaled could, in theory, help to address the aforementioned challenges relating to the inability to control balloon placement, the act of moving on-board sensing equipment generates a reaction force that is likely to upset the stability of lightweight systems, causing undesirable wobble and a failure of the equipment to accurately point at and capture its target

SUMMARY

A method for creating a composite image includes receiving a group of images indexed according to a time-consecutive capture sequence and captured by an aerial imaging system. Each image in the group is evaluated for potential inclusion in the composite image. The evaluation of each image entails determining whether a spatial footprint of the image is entirely internal to a polygon formed based on a union of spatial footprints corresponding to images positioned on a same side of the image within the time-consecutive capture sequence. If the spatial footprint of the image is not entirely internal to the polygon, an identifier for the image is added to a composite image array. Otherwise, the identifier of the image is excluded from the composite image array. After all images have been evaluated, the composite image is created by stitching together images with respective identifiers included in the composite image array.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. These and various other features and advantages will be apparent from a reading of the following Detailed Description.

BRIEF DESCRIPTIONS OF THE DRAWINGS

DETAILED DESCRIPTION

Figure 1:
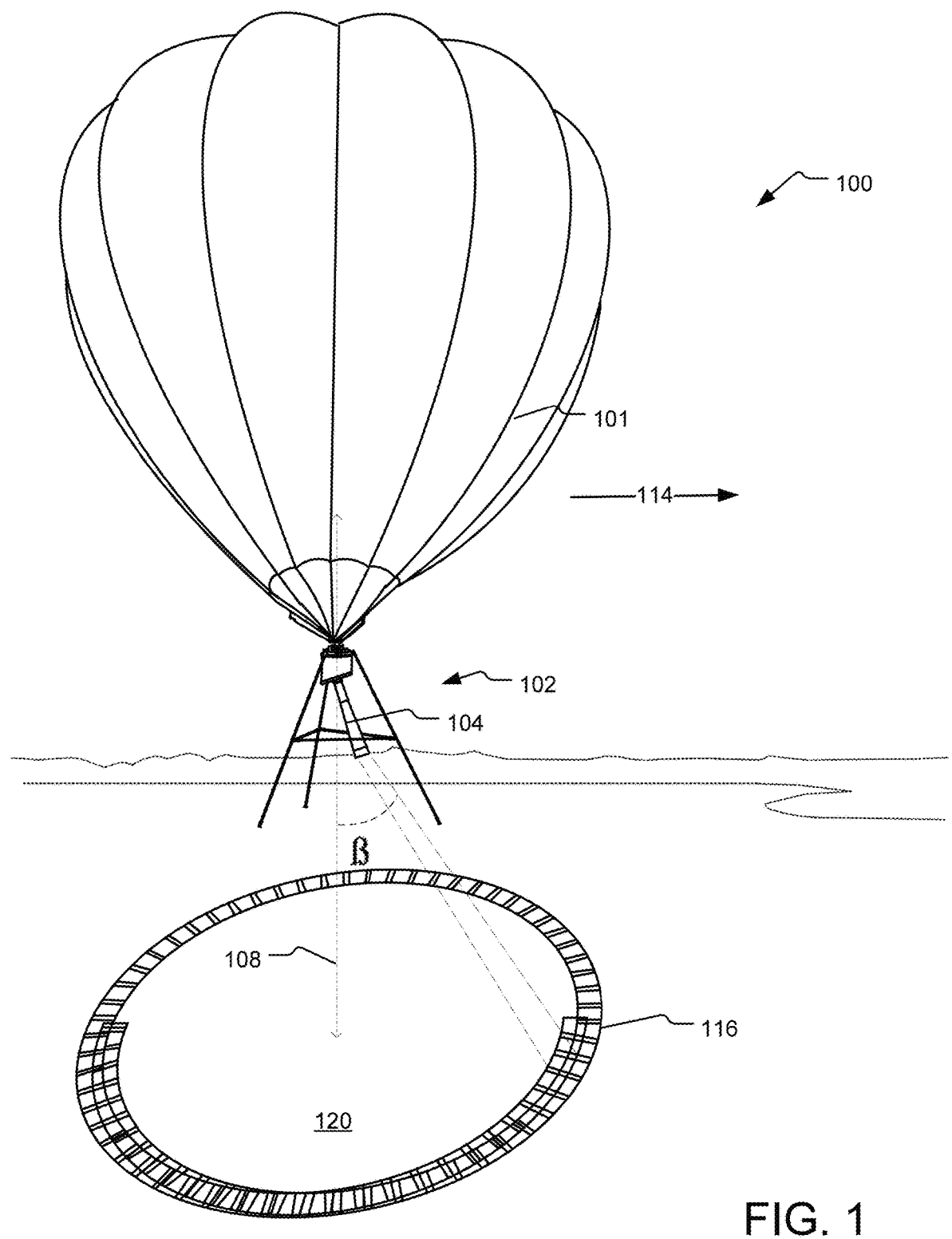
FIG. 1 illustrates an example aerial image capture system that rotates a camera about a single axis to provide complete coverage of an area of interest.

Aerial images are commonly captured by manned aircraft or low altitude drones. In both types of vehicle, transit velocity can be controlled along with flight path. Consequently, complete aerial coverage of an underlying area can be easily attained (e.g., by flying in a lawnmower pattern flight path) and the time elapse between images can be easily calculated using the transit velocity and the image frame rate. This time elapse can be useful in a variety of applications such as stereo imaging. In contrast to manned aircraft and drones, high-altitude balloons are propelled by wind and therefore restricted to single flyovers. Since balloon direction and velocity is not always controllable in balloon systems, existing balloon imaging systems tend to rely on cameras that move to provide desired coverage, such as cameras that can be moved along a 3-axes gimbal. However, due to the lightweight nature of high-altitude balloon systems, the smallest camera accelerations (e.g., camera movement starting and stopping) can introduce inertial instabilities that may cause the entire system to undesirably wobble or swing from side to side.

Aerial imaging techniques disclosed herein well adapted for use in lightweight flight vehicles, such as high-altitude balloon systems, to capture wide swaths of aerial imagery that provide full coverage of terrain areas of interest without introducing system perturbations that risk introducing inertial instabilities (e.g., camera accelerations that may cause the system to wobble or sway from side to side). According to one implementation, the foregoing is achieved by fixing a camera at a select angle relative to a geometric center of payload carried by the flight vehicle. For example, rather than pointing the camera straight down along an axis parallel to the direction of gravity (e.g., an earth-normal axis), the camera is fixed at an select angle relative to the earth-normal axis. With the camera fixed at this offset angle, a single-axis gimbal is employed to rotate the camera in a circle around the earth-normal axis while the vehicle is in flight and moving laterally relative to underlying terrain. In one implementation where the rotational axis of the camera is substantially aligned with a gravitational center of the payload, camera rotation is achieved without changing the center of gravity of the payload. Thus, the rotational movement of the camera does not introduce perturbations with the potential to upset the inertial stability of the system (e.g., payload wobble is not introduced by camera movement). As used herein, "substantial alignment" refers generally to an alignment that is within +/−5 degrees of actual alignment.

In the above-described systems, the rotational movement of the camera facilitates imaging of rounded (e.g., semi-circular) swaths of underlying terrain. Due to the transit velocity of the balloon system relative to the underlying terrain, each rounded swath is offset laterally in the direction of vehicle transit from the previously-captured swath, resulting in a coverage area resembling a side-moving spiral that-over several camera period rotations-provides complete coverage of an area of interest. This and other implementations are described in greater detail with respect to the following figures.

FIG. 1 illustrates an example aerial image capture system 100 that rotates a camera in a circular path about a single axis to provide complete coverage of an area of interest. The system includes a high-altitude balloon 101 supporting a payload 102. In different implementations, the payload 102 may include a variety of remote sensing instruments. By example and without limitation, the payload 102 is shown including a camera 104. However, in some implementations, the herein disclosed imaging techniques are performed by other types of sensors, such as RF. The camera 104 is suspended via a single axis gimbal assembly that rotates the camera 104 in a circular path about a rotational axis 108 while keeping the camera fixed at an off-nadir angle (β). In one implementation, the entire payload 102 rotates about the rotational axis 108, and the rotational axis 108 is aligned with a center of gravity of the payload. In various implementations, the off-nadir angle (β) may vary from between about 5 and 75 degrees.

The high-altitude balloon 101 is propelled laterally (e.g., in a direction represented by arrow 114) relative to underlying terrain by wind. Due to the variability of wind speeds, the system may have a transit velocity subject to uncontrollable changes in magnitude and direction. During a single path flyover of a region of interest, the rotational movement of the camera facilitates capture of a sequence of terrain images offset relative to one another along a path 116 that may be generally circular in shape due to the rotational period of the camera. Notably, the camera 104 has a narrow field-of-view such that the resulting images capture a somewhat "skinny" curved swath that forms a perimeter around a generally circular area 120 that is external to the camera's field of view. That is, the camera 104 images the perimeter of the generally circular area 120 but the area internal to this perimeter is, on any given rotation, external to the field-of-view of the camera 104.

Notably, this path may not be perfectly circular due to elevational changes in terrain and lateral balloon system movement; therefore, the path 116 is referred to herein as being "pseudo-circular." Over a period encompassing several camera rotations, the swath of images grows to include multiple successively-captured pseudo-circular swaths, each being laterally offset from the sequence captured during the last camera rotational period. Due to the fixed off-nadir angle (β) of the camera 104, the imaged area gradually widens over several rotations. When viewed as a whole (e.g., as shown) the string of pseudo-circular swaths resembles a side-moving spiral on the underlying terrain. The result is a full-coverage map of such terrain.

Notably, high altitude balloon systems are very lightweight and thus have low inertial stability. Small forces, such as camera accelerations, in the payload have the potential to shift the center of gravity of the payload 102 and upset the system's inertial stability, which may cause the balloon and payload to start swinging side-to-side. However, the above-described mythology eliminates this problem in implementations where the camera 104 is rotated about a single axis that is aligned with the center of gravity of the payload 102. This technique ensures that the center of the gravity of the payload r102 remains constant throughout the imaging process, preserving inertial stability of the entire system.

Figure 2:
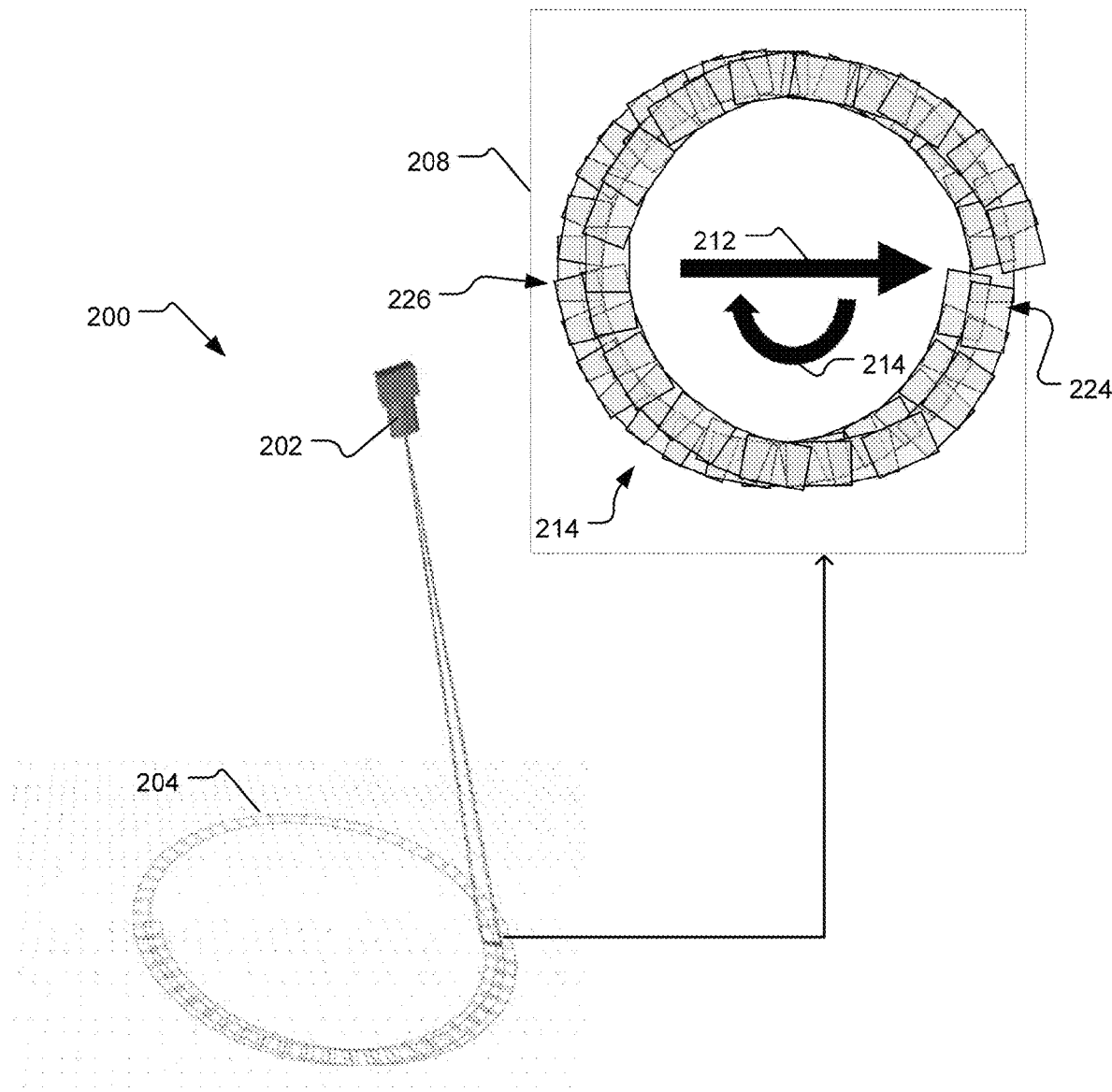
FIG. 2 illustrates an exemplary aerial imaging system with a camera that rotates about a payload gravitational center to capture a swath of images resembling a side-moving spiral.

FIG. 2 illustrates aspects of an exemplary aerial imaging system 200 with a camera 202 that rotates about a gravitational center of a payload to capture a swath 204 of images that resembles a side-moving spiral. Although not shown, the camera may be suspended from a payload supported by flight vehicle, such as in the matter described above with respect to claim 1. According to one implementation, the imaging system and techniques employed to capture the swath 204 are the same as those discussed above with respect to FIG. 1. Top-down view 208 illustrates the swath 204 and its respective images in greater details. The images in the swath 204 are captured during two rotations of the camera 202 while the aerial imaging system 200 moves laterally across the sky in a direction shown by the arrow 212.

By example and without limitation, the images of the swath 204 may be captured when the camera 202 is rotating in the clockwise direction (as shown by arrow 216) when viewed from the top-down (e.g., an earth-facing position).

For clarity of concept, the image set captured in each period of rotation of the camera may be understood as having a leading edge 224 and trailing edge 226, where the leading edge 224 represents an edge of the path corresponding to a camera-forward position relative to the direction of arrow 212 indicating lateral system movement, and where the trailing edge 226 represents an edge of the path captured on the same (most-recent) rotation of the camera 202 when the camera 202 was last positioned 180 degrees opposite the camera position corresponding to the leading edge 224.

If the image set 214 were expanded over several additional camera rotations while the balloon system progressed in the direction represented by the arrow 212, the trailing edge 226 of the period corresponding to the current rotation may, in time, catch up to the images captured proximal to the illustrated position of the leading edge 224. As this happens, the aerial coverage provided by the image set 214 expands laterally, becoming first an oval and then eventually a long strip or swath of aerial imagery corresponding to a wide area of land. In one implementation, each individual frame in the image set is a high-resolution image that can be highly magnified; thus, the collected image set collected during a single flyover of the high-altitude balloon system may provide complete, high magnification coverage of an area of interest.

Figure 3:
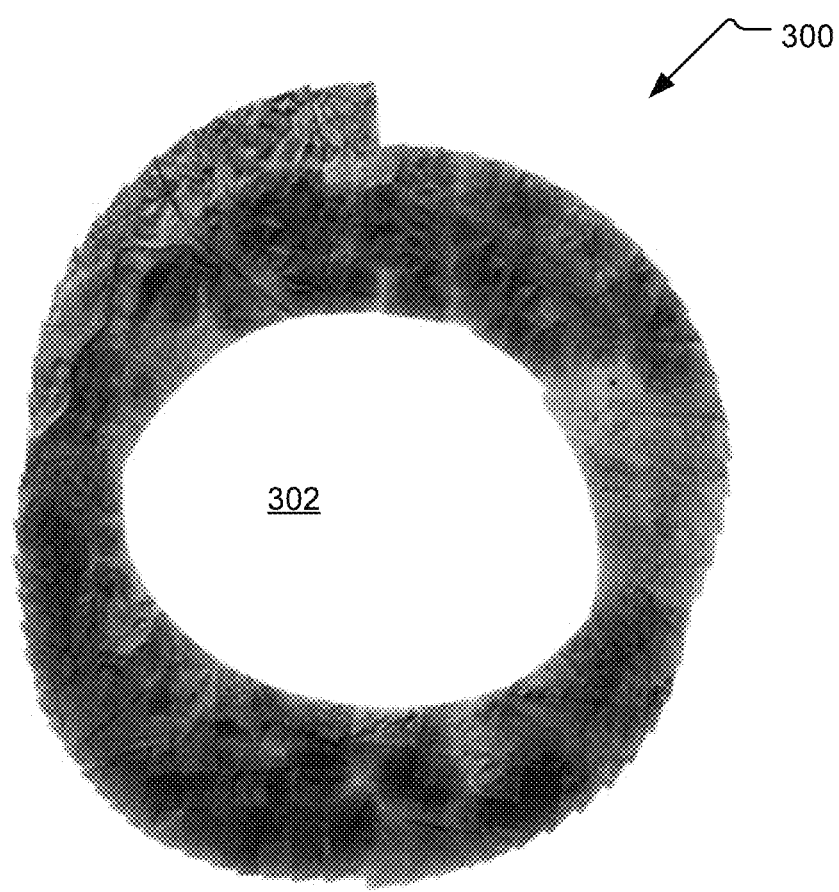
FIG. 3 illustrates an exemplary image set captured via a high-altitude balloon aerial imaging system via the techniques described above with respect to FIG. 2.

FIG. 3 illustrates an exemplary image set 300 captured via an aerial imaging system via the techniques described above with respect to FIG. 1. The image set is a black-and-white representation of data captured by a thermal imager over several rotations of a camera (not shown) about a circular path at a select offset angle from a payload center of gravity (e.g., as described above with respect to FIG. 1 and FIG. 2). As shown, the edges of map generated by the collection of images in the image set 300 have a saw-tooth pattern due to the overlapping arrangement of individual frames captured as the camera was rotated above the scene while rapidly capturing images. If, in the illustrated example, the flight vehicle for the aerial imaging system (e.g., high-altitude balloon) were to continue progressing across the sky, a blank area 302 may in time be filled with captured images providing complete coverage of this area.

Figure 4:
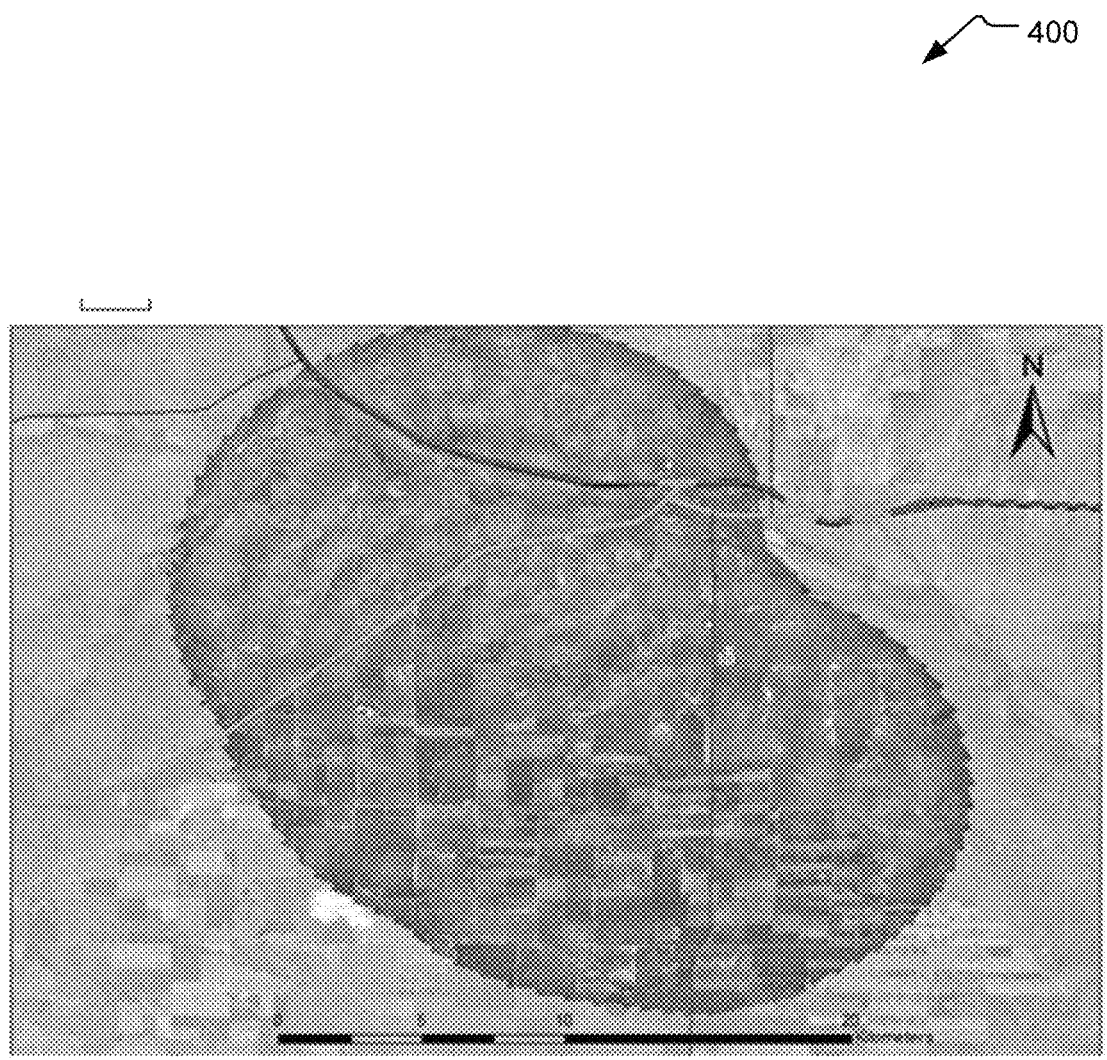
FIG. 4 illustrates another exemplary image set captured via a high-altitude balloon aerial imaging system via the techniques described above with respect to FIG. 1 and FIG. 2.

FIG. 4 illustrates another exemplary image set 400 captured via a high-altitude balloon aerial imaging system via the techniques described above with respect to FIG. 1 and FIG. 2. That is, a rotating camera captures a sequence of images that map to a swath representing a side-moving spiral (e.g., a pseudo-circle that moves laterally with each rotation of the camera). In FIG. 4, the swath of images has grown such that a trailing edge of the most recent period of the spiral-like swath has caught up with the initial leading edge during the first period of the camera's rotation, providing full coverage of an area of interest.

Figure 5:
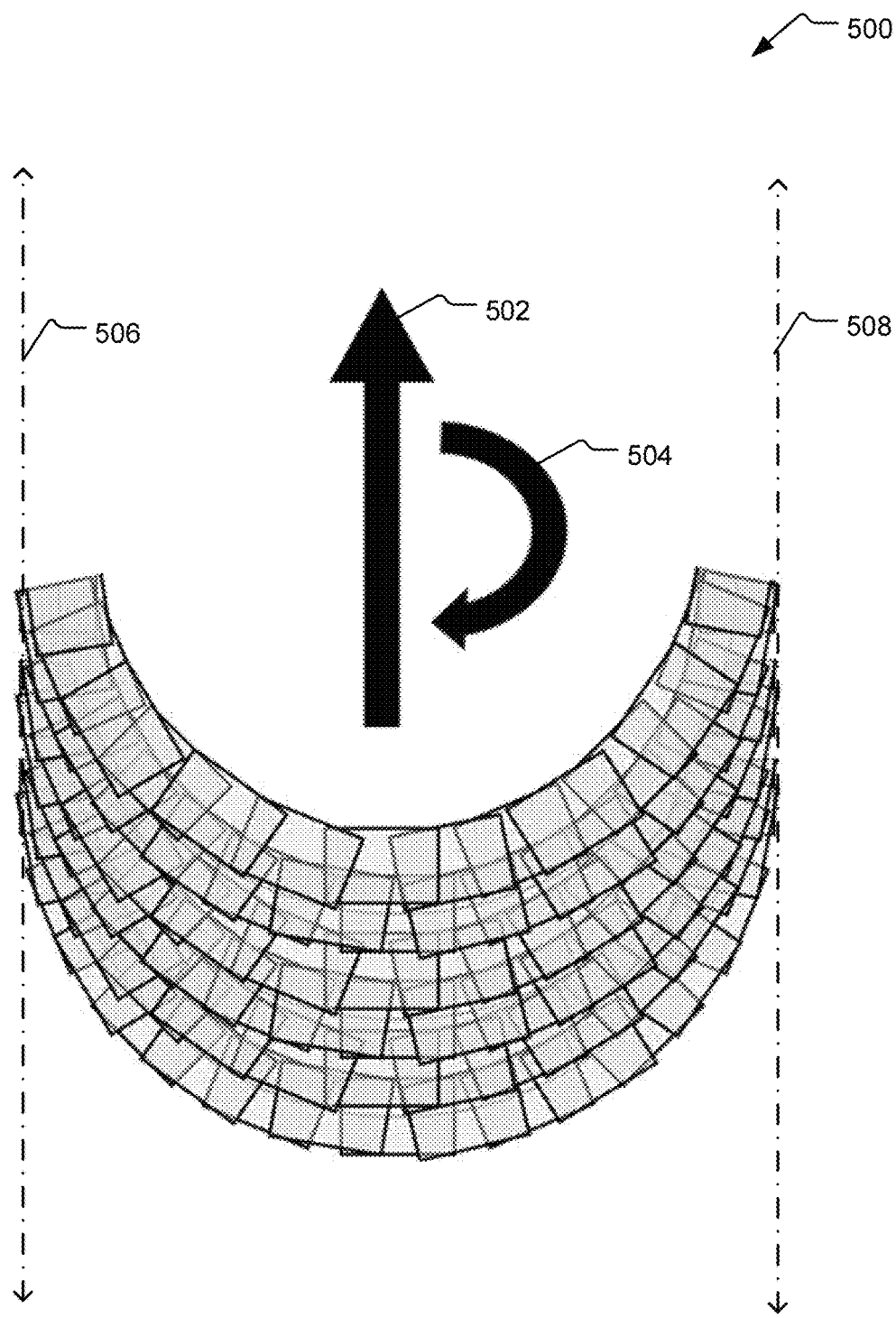
FIG. 5 illustrates an example image set captured via a high-altitude balloon imaging system (not shown) employing the techniques described above with respect to FIG. 1-2.

FIG. 5 illustrates an example image set 500 captured via an aerial imaging system employing the techniques described above with respect to FIG. 1-2. Like the image sets described above, the image set 500 of FIG. 5 may be captured via an imaging system on a high-altitude balloon or other flight vehicle with a camera that rotates (e.g., in a clockwise direction 504) on a single gimbal axis about the gravitational center of a payload. The imaging technique employed to capture the image set 500 differs from those shown and described above with respect to FIG. 1-3 in that the camera is turned off for half of the rotation period.

If the high-altitude balloon system is moving laterally (generally parallel to earth) in the direction of an arrow 502, the trailing edge of images captured shifts in this same direction with each new rotation of the camera. Thus, over time, complete coverage may be obtained of an underlying area in-line with the system's direction of motion (e.g., between bounds 506, 508). Turning the camera off for half of each rotation (as shown) may provide benefits such as power savings, reduced data storage demand, and reduced processing overhead. Conversely, however, this technique eliminates the capture of time-separated images of the same target, which means the image set is not feasible for certain types of imaging techniques, such as stereo imaging, tracking of moving objects, etc.

Figure 6:
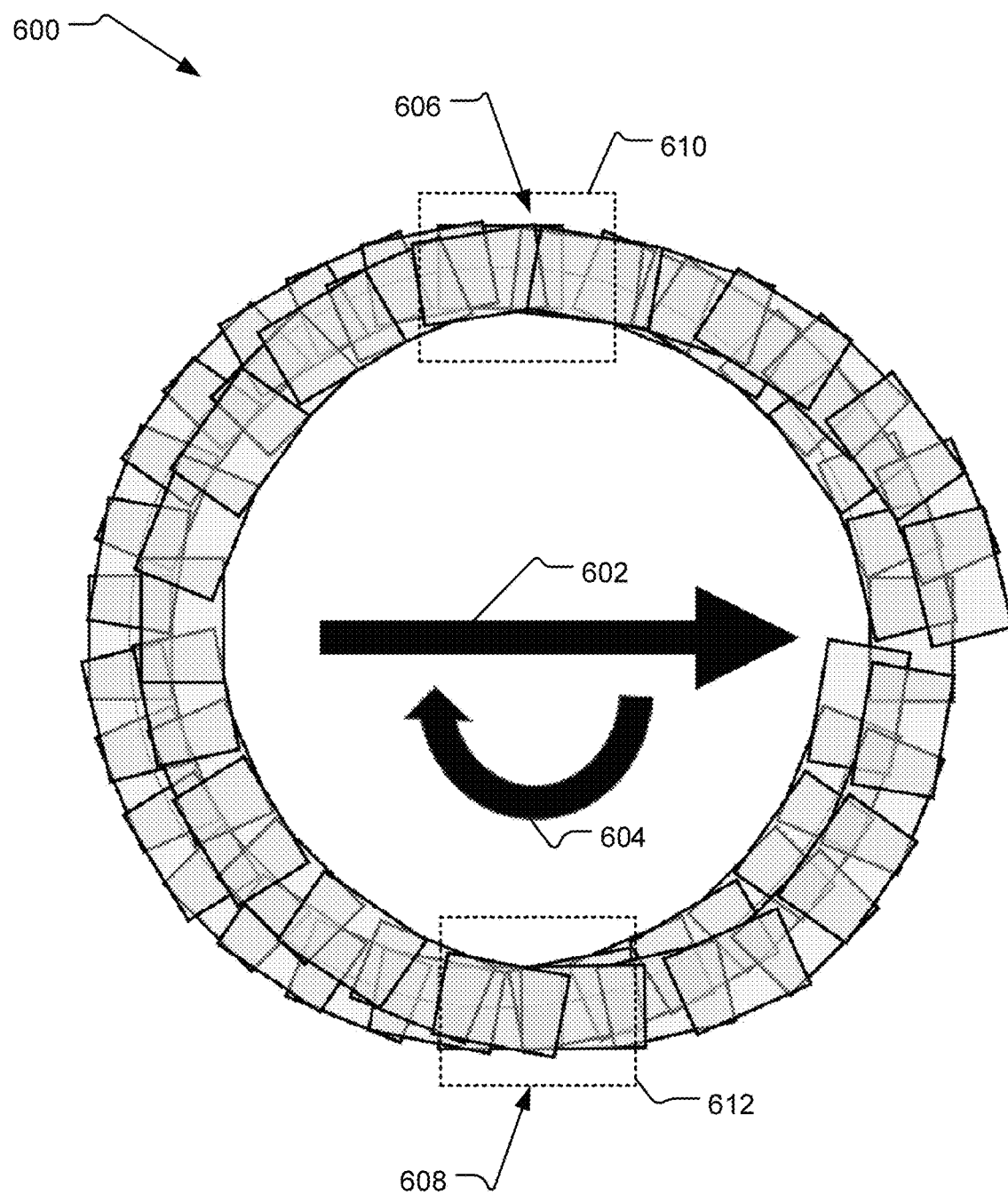
FIG. 6 illustrates another example image set captured via the techniques discussed above, with additional annotations to clarify modifications of the methodology that may be employed in some implementations.

FIG. 6 illustrates another example image set 600 captured via the techniques discussed above. In this figure, additional annotations are shown to clarify modifications of the methodology that may be employed in some implementations. The image set 600 may be understood as captured by an imaging system including a flight vehicle moving laterally relative to earth in a direction indicated by the arrow 602 while a camera attached to a payload of the flight vehicle is rotating in a clockwise direction indicated by the arrow 604. As used herein, the term "sweep velocity" refers to a velocity of the imaged area as it is generated on the ground. "Transit velocity" is used to refer to the lateral velocity of the imaging system relative to earth. Because the sweep velocity of the system may be many times faster than the transit velocity, an image stabilization system could be used to allow for long image integration times without creating motion blur in the images.

Due to the lateral movement of the imaging system, the sweep velocity of the camera adds to the system's transit velocity at a first side edge 606. For the same reason, the sweep velocity of the camera subtracts from the system's transit velocity at a second side edge 608. This phenomena can result in unequal overlap between successively-captured images on each of these opposing sides. That is, the amount of overlap between sequentially-captured images in region 610 will be less than the amount of overlap between sequentially-captured images in region 612. This phenomena is referred to herein as "unequal side lap."

Figure 7A:
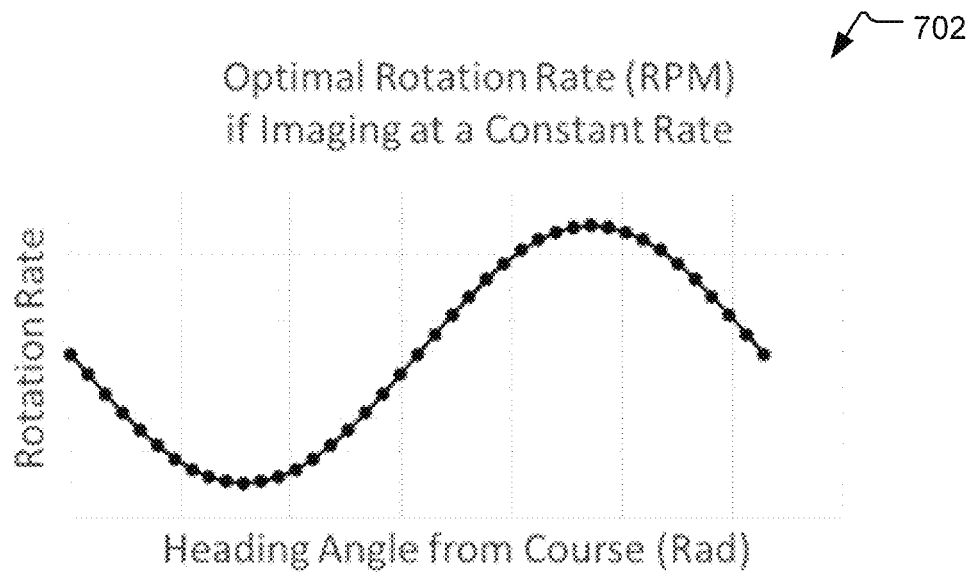
FIG. 7A illustrates variations in camera rotation rate that may be implemented to ensure even side lap in a high-altitude imaging system that captures a swath of images resembling a side-moving spiral.
Figure 7B:
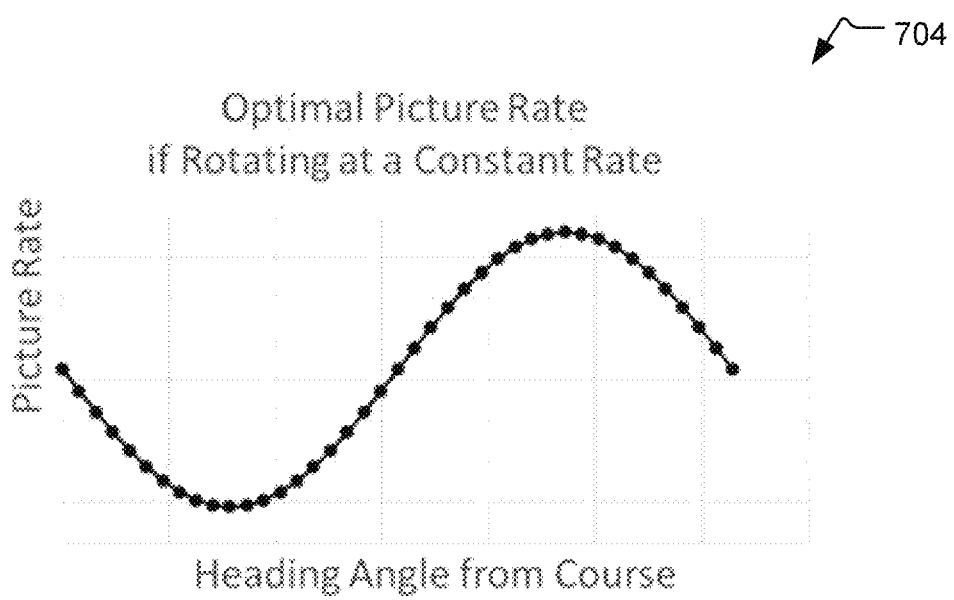
FIG. 7B illustrates variations in image capture rate that may be implemented to ensure even side lap in a high-altitude imaging system that captures a swath of images resembling a side-moving spiral.

In some imaging applications, unequal side lap does not pose a problem and thus no corrective actions are implemented. For example, some systems may implement constant camera rotation and constant frame rate capture. In other applications, however, it may be desirable to "even out" the side lap in the regions 610 and 612 by implementing adjustments to frame capture rate and/or camera rotation rate. For example, if an image processing algorithm were to employ an image stacking or coaddition technique (such as the Lucy-Hook coaddition method) to reduce noise in the imagery, it would need roughly the same number of "layers" of imagery at all locations, which depends upon uniform overlap from frame to frame to avoid some areas having more layers than others and variable image quality in the final product. FIGS. 7A and 7B propose two different types of adjustments to the imaging process that can be implemented to ensure even side lap along the image swath. Both of these adjustments are described with respect to a "heading angle," which may be understood as the angle between the transit velocity vector and a vector defined in the same plane representing the direction the camera is facing at any given point in time.

FIG. 7A illustrates a graph 702 showing example variations in camera rotation rate that may be implemented to ensure even side lap (as defined above) in a high-altitude imaging system with the features discussed with respect to any of FIG. 1-6. Specifically, the graph 702 illustrates a sinusoidal variation in the rotation angle of a camera as a function of the system's heading angle (also defined above). The camera is, in one implementation, rotating in a circle, on a single-gimbal axis, where the circle is centered on the center of gravity for the system's payload. Throughout the rotation, the camera is positioned at a fixed angle from the earth-normal vector. Since the camera is rotated in a circle centered on the payload's gravitational center, camera acceleration and decelerations can be achieved without introducing sway (wobble). Thus, the illustrated variations in the camera rotation rate may be implemented to even-out the image side lap (as defined above) without introducing perturbations that are likely to upset the system's inertial stability.

FIG. 7B illustrates another graph 704 showing example variations in frame capture rate of a camera that may be implemented to ensure even side lap (as defined above) in a high-altitude imaging system with the features discussed with respect to any of FIG. 1-6. Specifically, the graph 704 illustrates a sinusoidal variation in the frame capture rate of the camera as a function of the system's heading angle. This implementation is an alternative to FIG. 7A that may be preferred in some implementations since it can be implemented in software without actuating any mechanical components of the system.

Notably, the exact adjustments to camera rotation rate and/or frame capture rate (picture rate) as a function of heading angle depend upon the desired overlap required, the transit velocity of the system (which is variable at different times), and the camera rotation rate. Using known trigonometric techniques, these variables can be utilized to calculate a minimum frame capture rate sufficient to produce the desired coverage. As shown in FIG. 7A, the rotation rate of the camera may be varied sinusoidally to create a constant image frame side lap at varying sweep velocities. Likewise, as shown in FIG. 7B, the frame capture rate is varied sinusoidally to create a constant image frame side lap at varying sweep velocities.

Figure 8A:
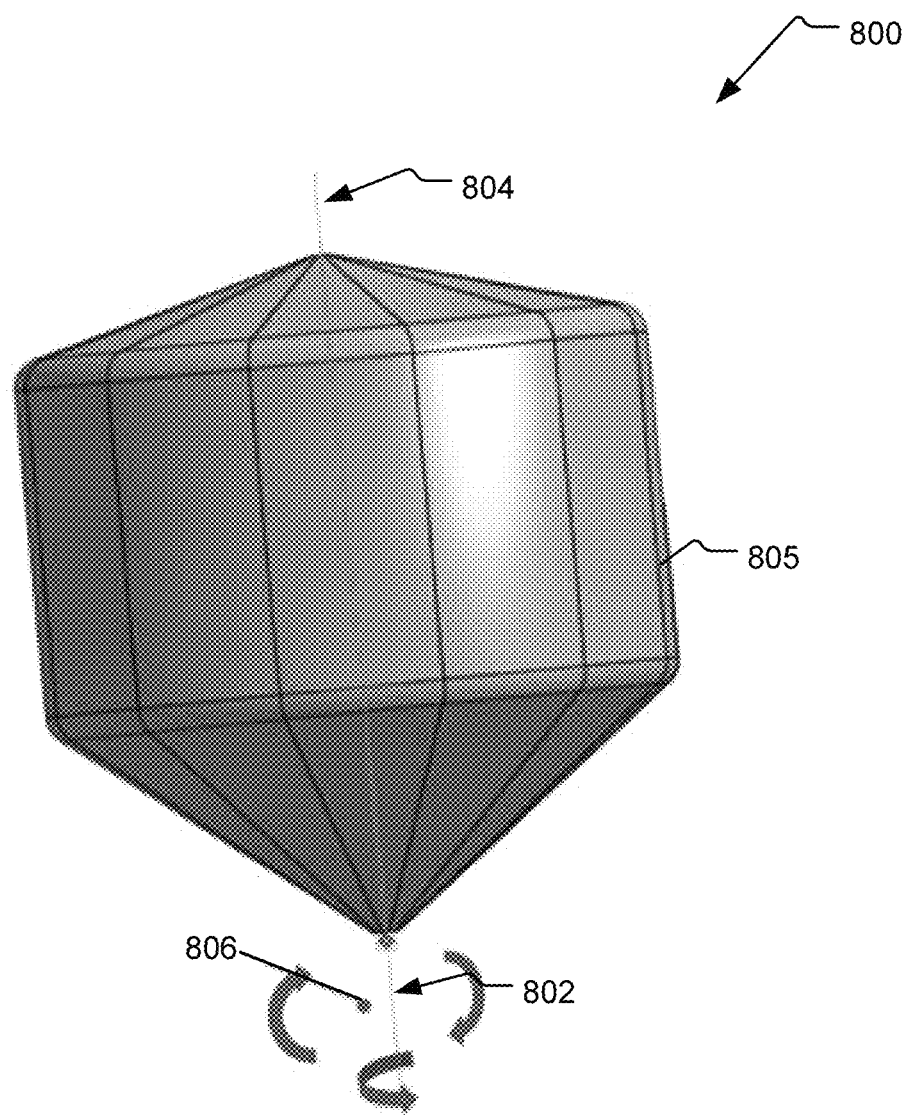
FIG. 8A illustrates a high altitude balloon system with a payload axis of rotation substantially aligned with a principal inertial axis of a balloon but misaligned with the payload center of gravity.
Figure 8B:
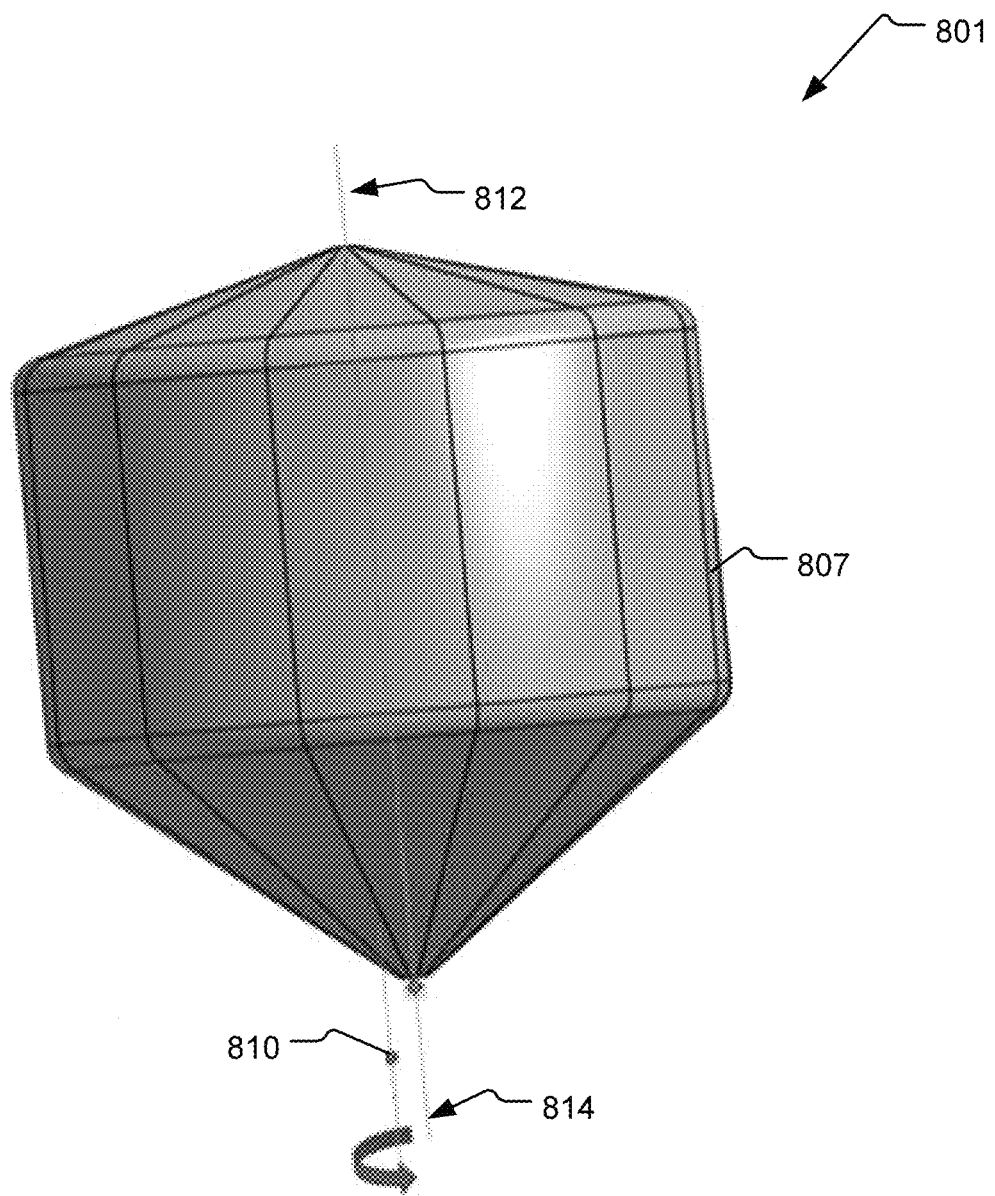
FIG. 8B illustrates a high altitude balloon system with a payload axis of rotation that is substantially aligned with a center of gravity of the payload but misaligned with a principal inertial axis of the balloon.
Figure 8C:
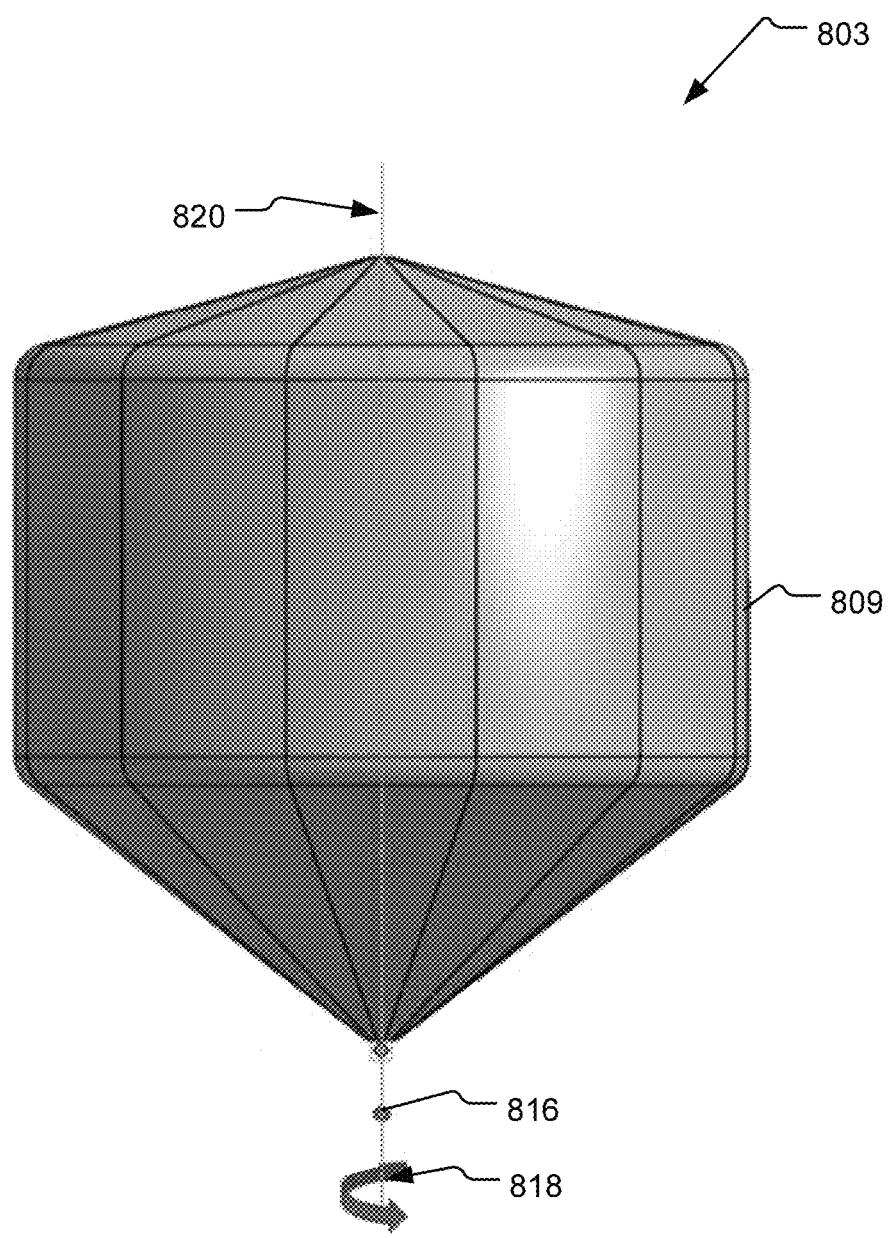
FIG. 8C illustrates another high altitude balloon system with a payload center of gravity substantially aligned with payload axis of rotation, both of which are substantially aligned with a principal inertial axis of a balloon.

FIG. 8A-8C illustrate variations in system component alignment that may alter the inertial stability of a high altitude balloon aerial imaging system. In inertially unstable systems, wobble is likely to occur and may impact usability and/or quality of images captured. In all of FIG. 8A-8C, it is assumed that the high-altitude balloon supports a payload (not shown) including a camera fixed at an off-nadir angle. The camera rotates, along with a payload, about a single axis of rotation.

FIG. 8A illustrates a high altitude balloon system 800 with a payload axis of rotation 802 substantially aligned with a principal inertial axis 804 of a balloon 805. A camera (not shown) is fixed at an off-nadir angle and rotated, with the payload, about the payload axis of rotation 802. A center of gravity 806 of the payload is not aligned with either the payload axis of rotation 802 or the principal inertial axis 804 of the balloon 805. Due to this misalignment, the high altitude balloon system 800 is likely to wobble as the payload rotates. In some cases, this wobble may render the images captured by the camera unusable.

FIG. 8B illustrates a high altitude balloon system 801 with a payload axis of rotation 808 that is substantially aligned with a center of gravity 810 of the payload. Here, a principal inertial axis 812 of a balloon 807 is not aligned with the payload axis of rotation 814. Due to this misalignment, the whole balloon system is tilted. However, the alignment between the payload center of gravity 810 and the payload axis of rotation 814 (e.g., the camera axis of rotation) ensures the payload does not wobble. Thus, while the configuration is not ideal because the image track may not form an organized curve on flat ground, high quality imagery can still be captured.

FIG. 8C illustrates another high altitude balloon system 803 with a payload center of gravity 816 substantially aligned with payload axis of rotation 818, both of which are substantially aligned with a principal inertial axis 820 of a balloon 809. In this case, the balloon system 803 remains straight (e.g., perpendicular to Earth) and the payload does not wobble. Here, high quality imagery can also be captured.

Figure 9:
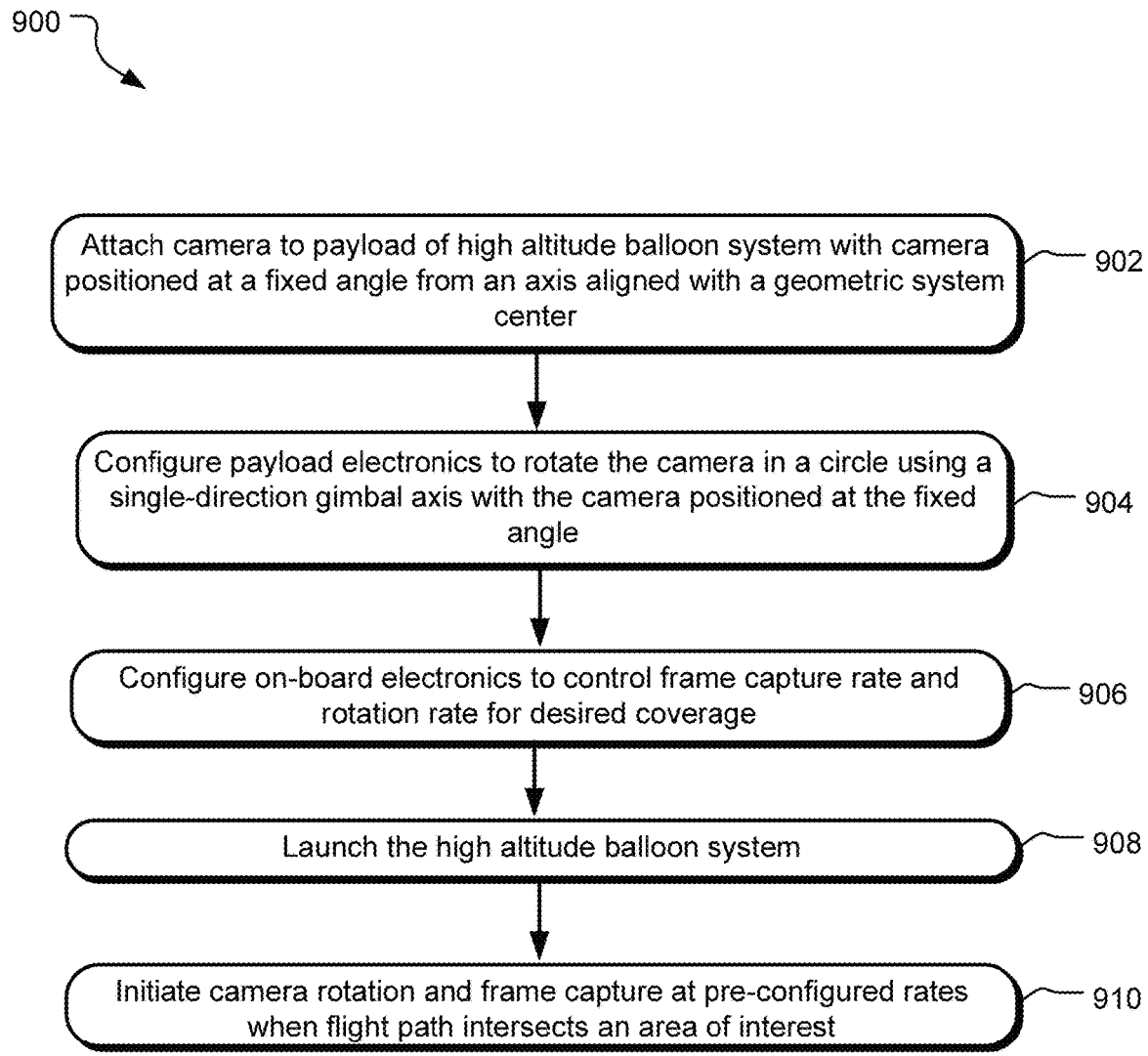
FIG. 9 illustrates example operations for capturing aerial imagery with a high-altitude balloon aerial imaging system.

FIG. 9 illustrates example operations 900 for capturing aerial imagery with a high-altitude balloon aerial imaging system. A payload assembly operation 902 assembles a payload to be attached to a balloon system such that a camera on the payload is positioned at a fixed angle from the system's geometric center. Stated differently, the camera has a field-of-view that is at a fixed angle relative to an axis aligned with the gravitational center of the payload. A camera configuration operation 904 configures on-board payload electronics to rotate the camera in a circle and at the fixed angle about the gravitational center via a single-direction gimbal axis. For example, the camera configuration operation 904 may entail loading memory on the payload with processor-executable instructions that are to be executed by an on-board processor, either at a scheduled time or responsive to receipt from specific command(s) from a ground-based transmitter.

Another configuration operation 906 configures on-board payload electronics to control frame capture rate and camera rotation to achieve a desired coverage. For example, the configuration operation 906 may entail loading on-board memory with processor-executable instructions for rotating the camera and/varying frame capture rate according to preselected parameters determined to be sufficient to provide the desired coverage.

A launching operation 908 launches the high-altitude balloon system and an initiation operation 910 initiates the camera rotation and frame capture according to the preconfigured parameters when a flight path of the system interests an area of interest (e.g., either responsive to receipt from one or more commands or as determined by on-board software based on available system location information and pre-loaded coordinates for the area of interest).

Figure 10A:
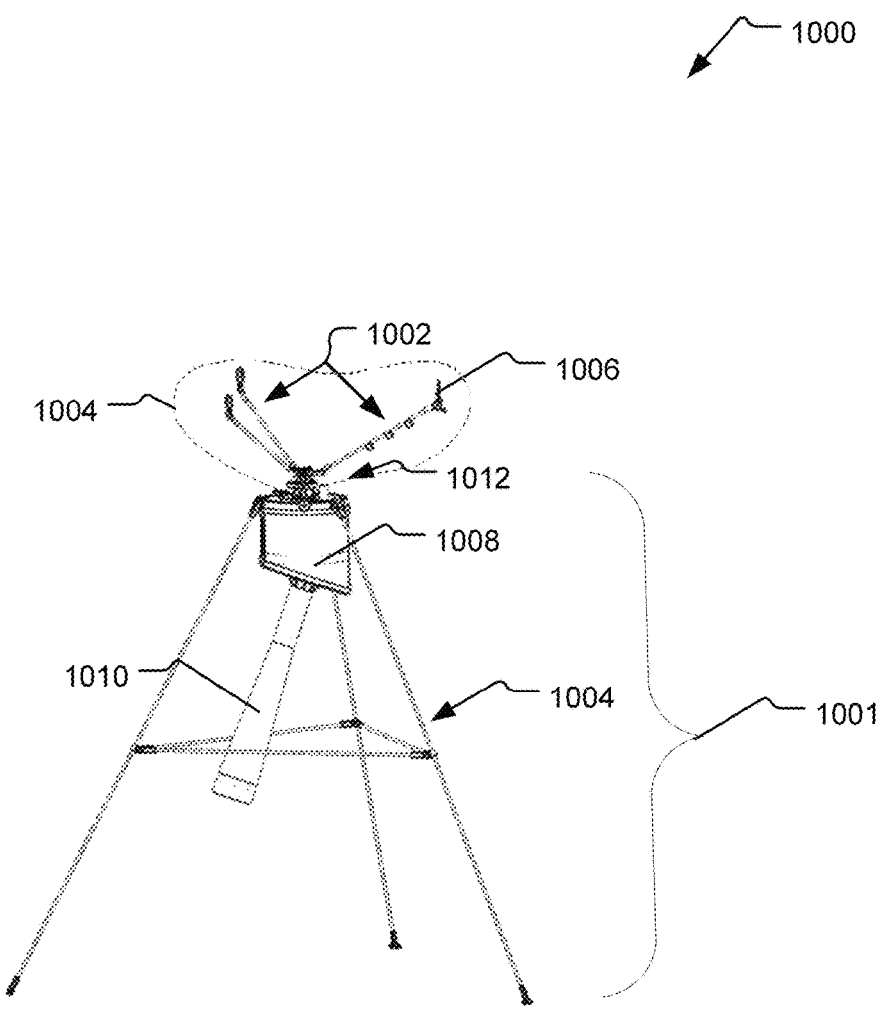
FIG. 10A illustrates aspects of a remote sensing system configured to capture aerial imagery using the techniques discussed herein.

FIG. 10A illustrates aspects of a remote sensing system 1000 configured to capture aerial imagery using the techniques discussed herein. The components include a payload 1001 that may be attached to a balloon or other flight vehicle via a suspension cage 1004 that includes three equidistant suspension arms 1002 that each further include an attachment link 1006 at the end most distal to payload 1001. This equidistant spacing between the suspension arms 1002 serves to stabilize the payload 1001 when in flight by equally distributing weight, thereby helping to prevent the payload 1001 from swinging relative to the flight vehicle (e.g., a high-altitude balloon) in high winds.

In the illustrated implementation, the payload 1001 includes a payload cannister 1008 supporting a camera with a lens 1010. The payload cannister 1008 includes electronics that control rotation of the payload 1001 relative to the suspension cage 1004. In addition to supporting the camera and lens 1010 (e.g., an aerial imaging high-resolution camera) the payload cannister 1008 may support and/or encase other control electronics and sensing equipment such as memory, one or more processors, other sensors, etc. In one implementation, the payload includes memory storing processor-executable instructions for controllably rotating the camera and/or selectively varying frame rate or camera rotation rate consistent with the methodology described with respect to FIG. 1-8 above. In FIG. 10A, the payload 1001 includes a rotation mechanism 1012 that is used to rotate the payload cannister 1008 and its remote sensing instruments (e.g., the camera and lens 1010) against a balloon envelope or other flight vehicle to create a uniform remote sensing swath as shown and described with respect to other figures herein.

Figure 10B:
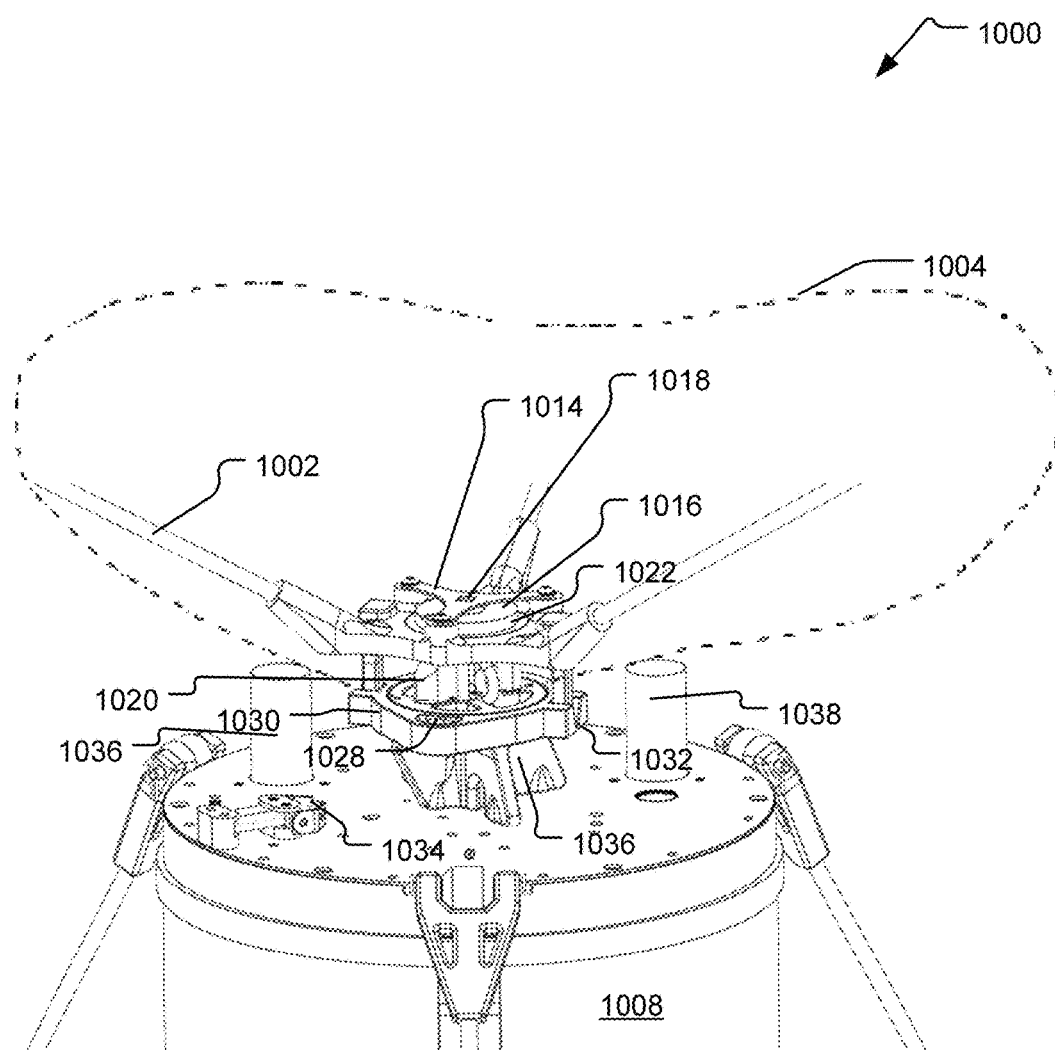
FIG. 10B illustrates further exemplary details of the remote sensing system of FIG. 10A.

FIG. 10B illustrates further exemplary details of the remote sensing system of FIG. 10A. In this view, the suspension arms 1002 are shown affixed to a central bracket which is affixed to a drive plate 1014. The drive plate 1014 includes a drive slot 1018 that may receive a driveshaft (not shown in FIG. 10A). The driveshaft may be inserted in the drive slot 1018 and rotated by motor to effectively rotate the payload cannister 1008 relative to the suspension cage 1004 (e.g., which includes suspension arms 1002, drive plate 1014, thrust bearing 1016, and a thrust bushing 1022 that is affixed to a separation block 1020).

In the specific implementation of FIG. 10B, the payload (e.g., including payload cannister 1008, rotation base 1036, and slip ring 1030) are designed to be controllably released from the suspension cage 1004 to initiate a termination sequence for the flight vehicle which is, in this implementation, a high altitude balloon. For example, the payload may be tethered to an upper end of a balloon envelope such that a controlled release of the payload tensions the tether and causes the balloon envelope to invert, releasing lift gas from an aperture that initially served as a vent duct. A detailed example of this type of system is described in detail in U.S. Pat. No. 10,953,975, entitled "Reusable Balloon System" (hereinafter the '975 patent) which is hereby incorporated by reference for all that it discloses or teaches. In one implementation consistent with the teachings of the '975 patent, the high-altitude balloon system includes a tether with a first end attached to an upper end of the balloon envelope (e.g., the end of the balloon facing away from earth when the balloon is in flight). An opposite end of the tether is attached to the payload. However, as described above, the payload cannister is designed to rotate during flight relative to the balloon envelope. In order to ensure that the tether does not get tangled around the payload, the tether is attached to an aperture 1028 in a slip ring 1030 that stays indexed relative to the balloon envelope and to the suspension cage 1004. The slip ring 1030 is, for example, a silicon dry-lubricated ring that slips relative to the rotation base 1036 that turns along with the payload cannister 1008.

Although the slip ring 1030 does not rotate with the payload cannister 1008, it may be configured to remain attached to the remainder of the payload (e.g., the payload cannister 1008 and rotation base 1036) when the payload is released from the suspension cage 1004 during a controlled flight termination sequence, as described in the '975 patent.

In FIG. 10B, the weight of payload cannister 1008 is supported a thrust bushing 1022 affixed to a separation block 1020, both of which stay attached to the suspension arms 1002 when the payload is controllably released. Controlled release of the payload (including the rotation base 1036, payload cannister 1008, and slip ring 1030) from the separation block 1020 may be enabled by a hotwire cutter mechanism 1034 that cuts through a structural attachment cord (not shown) laced through the rotation base 1036 and attached to the separation block 1020. The severing of this structural attachment cord causes the payload cannister 1008, rotation base 1036, and slip ring 1030 to fall away from the suspension cage 1004 (e.g., including the separation block 1020 and suspension arms 1002 among other components).

Figure 10C:
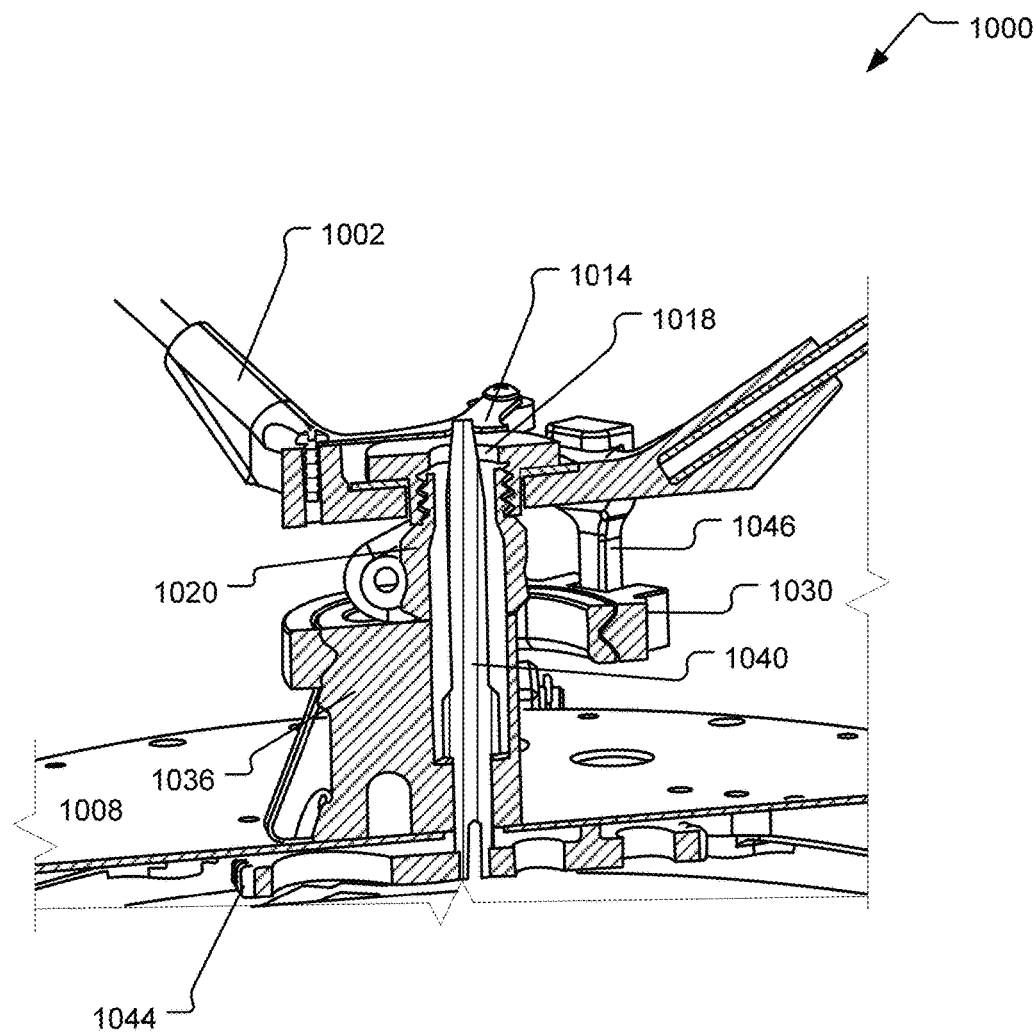
FIG. 10C illustrates a cross sectional view of a portion of the remote sensing system of FIGS. 10A and 10B.

FIG. 10C illustrates a cross sectional view of the remote sensing system shown in FIGS. 10A and 10B. In this view, suspension arms 1002 are shown affixed to a drive plate 1014 that includes a drive slot 1018. A driveshaft 1040 (excluded from the view of FIG. 10B) is shown threaded through the drive slot 1018 and through both the rotation base 1036 and the separation block 1020. Rotation of the payload cannister 1008 is affected by a motor (not shown) that turns a rotating gear 1044 affixed to the driveshaft 1040, rotating both the rotation base 1036 and the payload cannister 1008.

By example and without limitation, the system may further include an arm 1046 engaged with the slip ring 1030. The arm 1046 is fixed relative to the suspension cage 1004, and the inside of the slip ring 1030 is affixed to the rotation base 1036. Thus, the slip ring 1003 remains fixed relative to the arm 1046 while the payload cannister 1008 rotates against the slip ring 1030.

Figure 11:
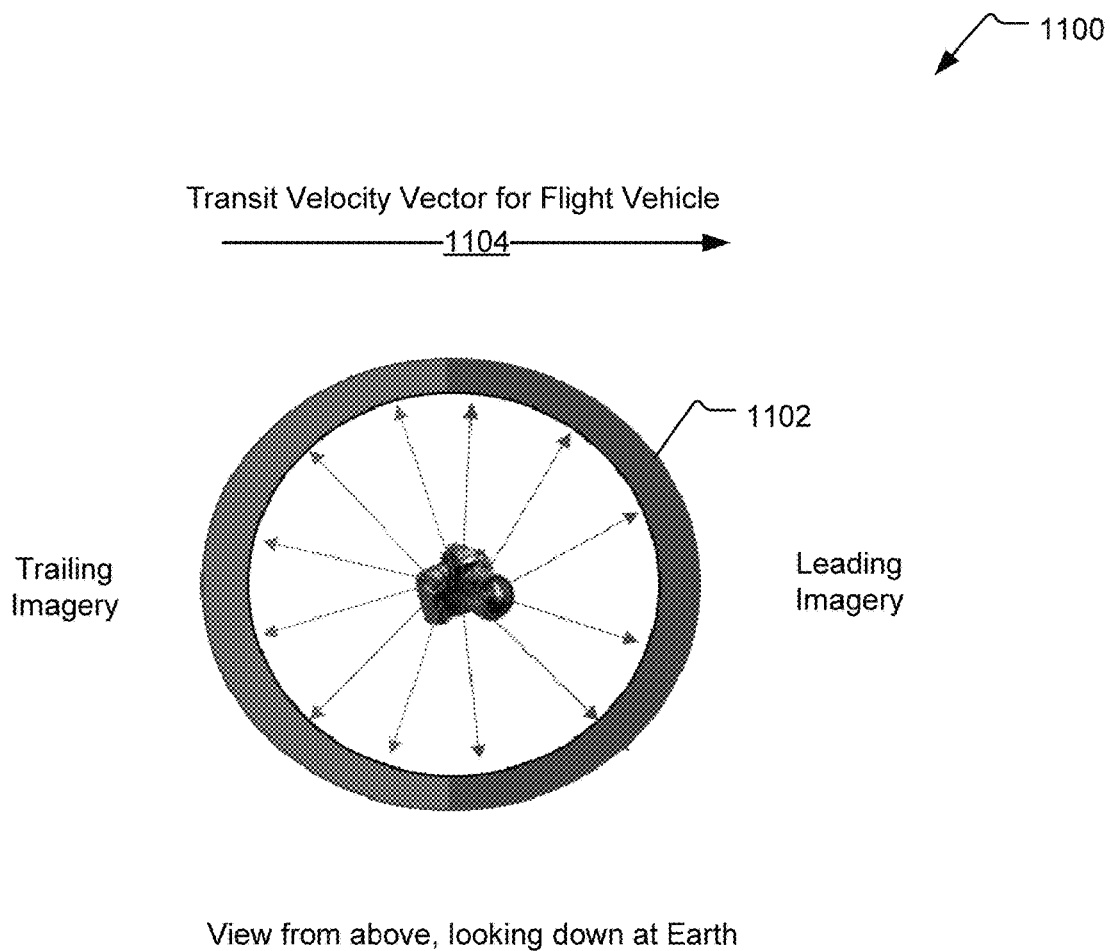
FIG. 11 illustrates an example diagram illustrating further aspects of an aerial imaging system.

FIG. 11 illustrates an example diagram 1100 illustrating further aspects of an aerial imaging system with characteristics consistent with one or more of the systems discussed above. Specifically, FIG. 11 illustrates aspects of the above-described aerial imaging process that help to explain a nomenclature used below in reference to FIGS. 12-17. Specifically, FIG. 11 illustrates a circular swath 1102 that may be understood as generally corresponding to terrain imaged while a camera is rotated one lap about a single-gimble axis aligned with an Earth-normal vector while also positioned at a fixed offset from the Earth-normal vector (e.g., as shown and described with respect to FIG. 1).

In FIG. 11, a transit velocity vector 1104 is shown for a flight vehicle that is carrying the camera relative to Earth. While the camera is rotated once around its axis of rotation, as shown, each image captured during the rotation can be classified as either a "leading edge image" or "trailing edge image" based on where the camera is facing relative to the direction of travel for the flight vehicle.

As the flight vehicle moves in the direction of the transit velocity vector 1104 and as the camera rotates, "leading imagery" is captured while the camera is looking forward, toward the "leading edge" of the camera lap. The term "leading edge" is used herein to refer to the portion of the camera lap corresponding to heading angles of the camera ranging in magnitude between 0 and 90 degrees (as shown), where the heading angle of the camera is defined by a separation between the transit velocity vector 1104 of the flight vehicle and a vector in the same plane representing the direction the camera is facing at a given point in time. In contrast to leading imagery, "trailing imagery" is captured while the camera is looking backward relative to the direction of vehicle transit, toward the "trailing edge" of the camera lap. The term "trailing edge" is used herein to refer to a portion of the camera lap excluded from the leading edge corresponding to heading angles for the camera ranging in magnitude from 90 to 180 degrees, as shown.

Figure 12:
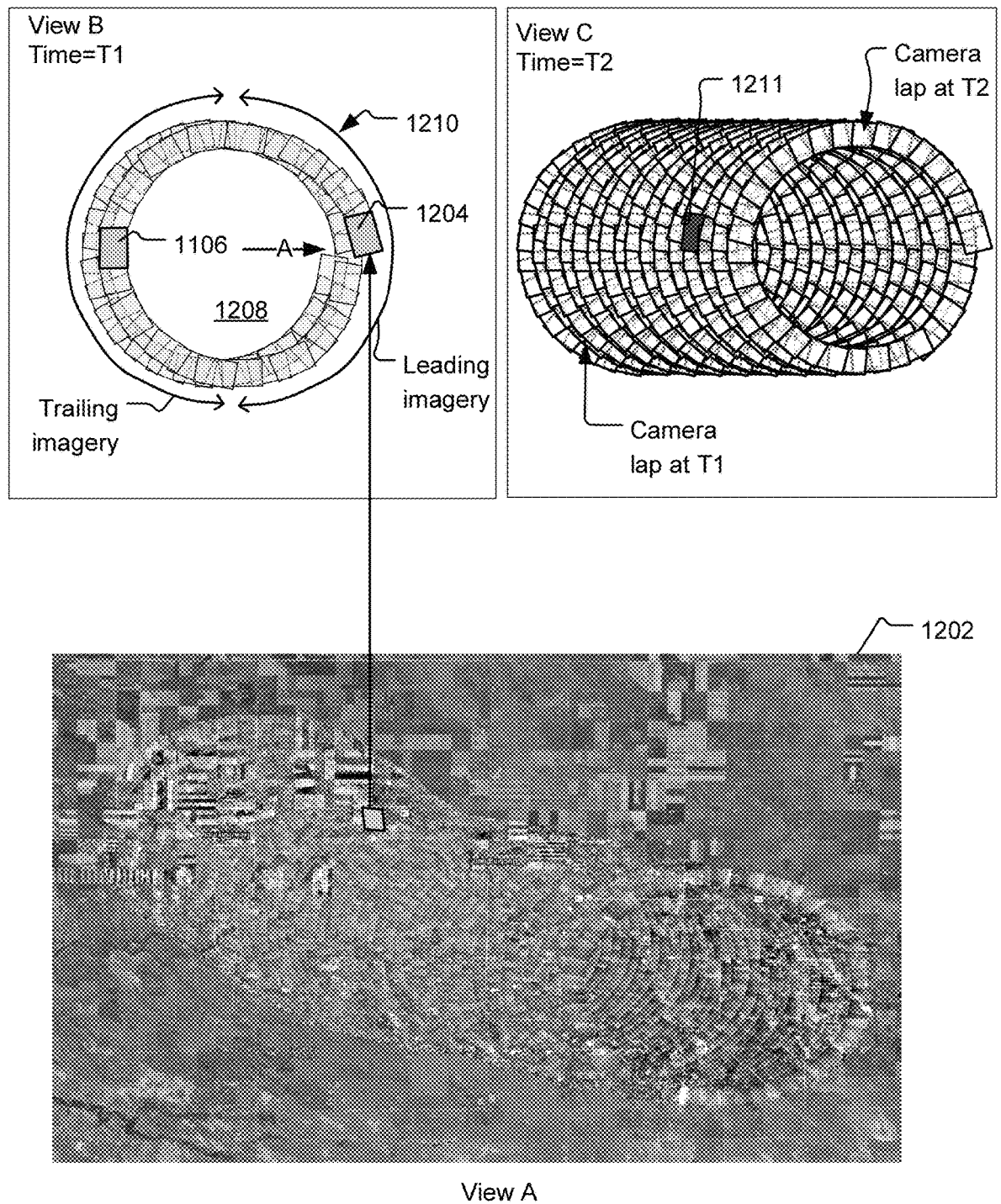
FIG. 12 illustrates an example composite image created from a collection of images captured by an aerial imaging system.

FIG. 12 illustrates an example composite image 1202 created from a collection of images captured by an aerial imaging system with characteristics the same or similar as those described above with respect to any of the implementations described herein. In FIG. 12, the composite aerial image 1202 is formed by stitching together images taken over multiple laps of the camera around its single axis of rotation while the flight vehicle is moving laterally relative to underlying terrain. The creation of the composite aerial image 1202 is conceptually described with respect to View B and View C, which illustrate respective subsets of the images that have been captured at two different points in time, T1 and T2.

Specifically, View B illustrates a first subset of images that have been captured at a first time, T1, that is very early in the imaging process. In this example, it is assumed that the flight vehicle is moving laterally relative to Earth in a direction generally indicated by a vector shown as arrow "A" in View B. Each rotation of the camera results in capture of a group of images that form a different lap of a spiral-like path 1210 of the underlying terrain. Notably, each image in the spiral-like path 1210 partially overlaps with the image taken just before it and the image taken just after it.

Consistent with the terminology introduced in FIG. 11, each lap within the spiral-like path 1210 can be understood as having a leading edge and a trailing edge, as labeled in View B. In the example shown in View B, the image 1204 is captured on the leading edge of a camera lap and the image 1206 is captured on the trailing edge of the same camera lap. At the time T1, two camera laps have been imaged and there exists an unimaged region 1208 in the center of the spiral-like path 1210.

View C illustrates a second subset of images that have been taken at a second time, T2, that is later in the same imaging process. Due to lateral motion of the flight vehicle, the spiral-like path 1210 has been extended to the right, in the direction of the transit velocity vector (A), and the unimaged region 1208 is now completely imaged due to capture of images along several subsequent camera laps. The trailing edge of the camera lap being captured at time T2 has caught up to, and passed, the leading edge of the camera in the first lap shown in View B.

Once the trailing edge of the camera lap has, at a given point in time, "caught up to" the same terrain imaged earlier by the leading edge of the initial laps (e.g., shown leading imagery in View B), the trailing images are all completely duplicative features captured in previous images. According to one implementation implementing this general methodology, each ground feature on the underlying terrain is essentially captured twice (in two images or two sets of images) as the flight vehicle moves across the underlying landscape. If, for example, a barn is included in a leading-edge image 1204 (in View B) captured on the leading edge of the first camera lap, the same barn also appears in at least one trailing-edge image 1211 (shown in View C) captured on the trailing edge of a subsequent camera lap. These two images or sets of images of the same ground feature may be taken potentially hours apart. For example, in one case the leading-edge image(s) of the barn are taken from the east side of the barn, looking at its east facing side, while the trailing edge image(s) of the barn are taken from the west side of the barn, looking at its west facing side. Notably, a pair of same-flight images of the same ground feature (e.g., a leading edge image and a trailing edge image) may have slightly different fields-of-view.

The imagery captured during the collection process, being either part of a "leading edge" of the imagery captured or a "trailing edge" of the imagery captured can be used to create stitched image products consisting of stitched-together frames that have partially overlapping fields-of-view.

In one implementation, the disclosed imaging technique allows for capture of different sets of images that capture a same area of interest (AOI) on the ground, taken at significant temporal offset relative to each other. For example, a barn may be imaged from the east on the leading edge of an early-captured camera lap and again a few hours later from the west on the trailing edge of a later-captured camera lap. Since consecutively-captured images have overlapping field-of-view, multiple frames taken on the leading edge may include the barn and multiple frames taken on the trailing edge also include the barn. An image of an area of interest can therefore be stitched together from either the set of leading images, the set of trailing images, or some combination of the two image sets. Moreover, since the relative position of the camera has changed between the leading images and trailing images (e.g., camera is looking backward rather than forward), it is possible to use a combination of the leading images and trailing images to construct a complete stereo image of the underlying terrain or a complete 3D image of the underlying terrain.

Figure 13:
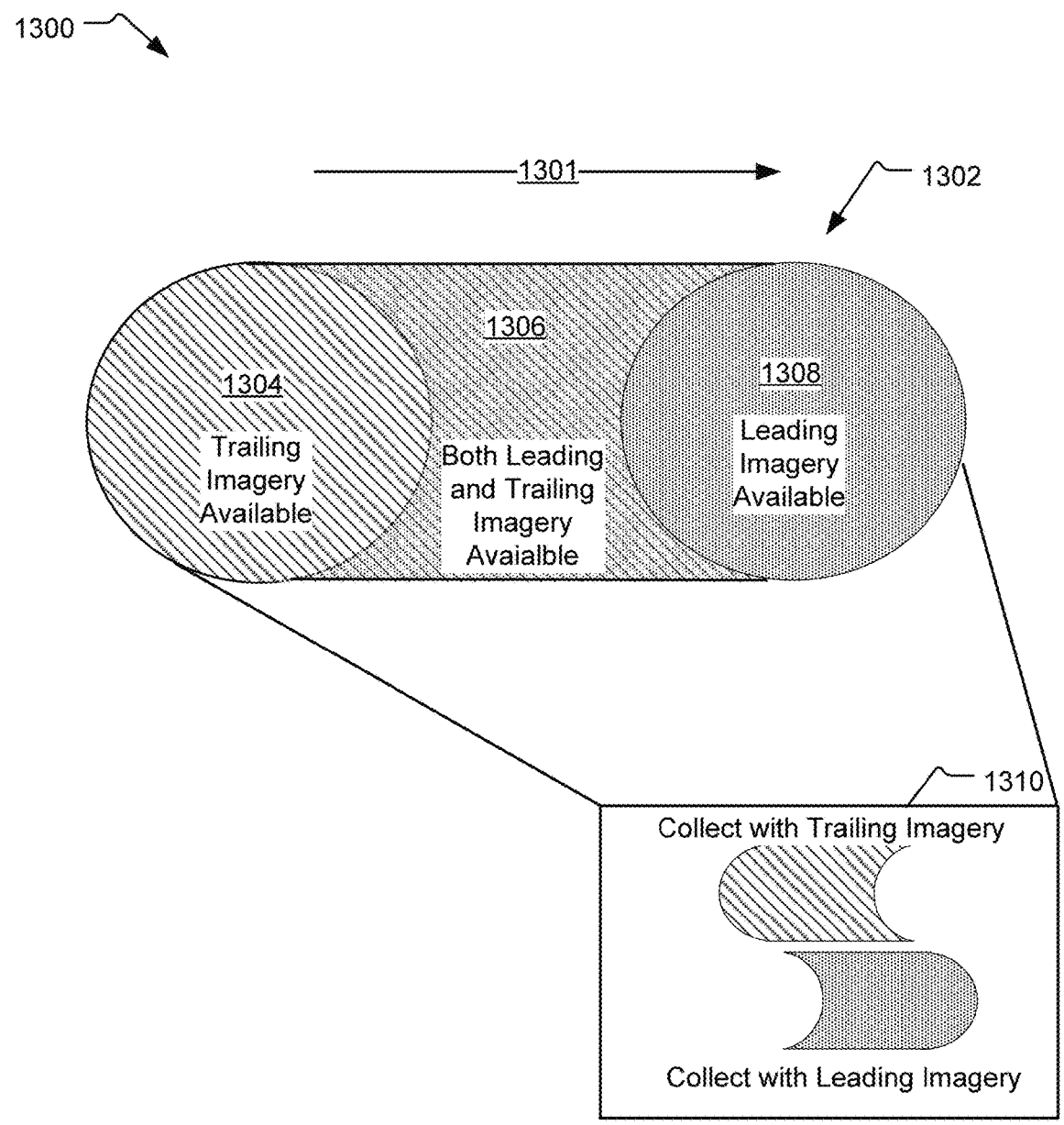
FIG. 13 illustrates an example diagram showing leading and trailing edge imagery that is collected during a continuous image collection operation performed during a single flyover by an aerial imaging system.

FIG. 13 illustrates an example diagram 1300 showing leading and trailing edge imagery that is collected during a continuous image collection operation performed during a single flyover by an aerial imaging system. The aerial imaging system has features consistent with any of the above-described system implementations. As the flight vehicle moves in the direction of arrow 1301, the camera traces multiple laps of a spiral-like path (as shown in FIG. 12), eventually imaging a long swath of the underlying terrain the resembles a side-moving spiral. The total geographical field-of-view covered by the image set during this operation is represented by graphic 1302.

Notably, terrain imaged on the first few laps of the camera is imaged once rather than twice as indicated by cap region 1304, which generally corresponds to the initially unfilled region 1108 of FIG. 11, View A. Once the flight vehicle has moved laterally enough that the trailing edge of the camera lap begins imaging terrain previously imaged by the camera on a leading edge of a previous lap (e.g., once the unimaged region 1208 of View B in FIG. 12 is completely filled with images), the trailing edge imagery is duplicative of previously-captured leading edge imagery, as generally indicated by region 1306. Then, toward the end of the image capture process, there exists another region 1308 that has been imaged by the leading edge of the camera but not yet by the trailing edge of the camera. For the region 1308, leading imagery is available but trailing imagery is not.

As generally indicated by the graphic 1302, the central region 1306 is imaged redundantly, first by the leading edge of the camera during a first set of camera laps and then subsequently by the trailing edge of the camera on a different (subsequent) set of camera laps. As mentioned previously, these imaging techniques can also facilitate construction of 2D images as well as stereo or 3D aerial images due to the fact the same area of interest is imaged twice from different relative camera angles (e.g., when the camera is facing the leading edge of the lap and later when the camera is facing the trailing edge of the lap). Also of note, the time delay between capture of corresponding leading edge and trailing edge imagery can facilitate the identification of objects that have changed in position or form in such time. For example, image processing software can be utilized to compare leading edge imagery of an area of interest to trailing edge imagery of the same area of interest, from a same flight of an aerial vehicle, to determine that an oil rig is operational, that a windmill is moving, or to make countless other observations of potential value. In scenarios where it is determined that object(s) of interest have changed in position or form in the time elapsed between the capture of leading edge imagery and the corresponding trailing edge imagery, events can be automatically logged and/or reported to a system administrator.

While the rich dataset captured during a single aerial flyover can facilitate construction of 2D images, 3D images, and also allow for a determination of whether and how imaged areas are changing over time, the processing of this dataset is complicated in part by the large quantities of images that are, potentially, of high resolution. In one implementation, an example image set collected per the above techniques has upwards of 25,000 images, each being greater than 40 megapixels in size and including more than 40 megabytes (MB) of data. Depending on selected resolutions and image overlap ranges, there may exist redundancy between different images. For example, a single ground feature may appear in 5 different leading edge images and again in 5 different, subsequently-captured trailing edge images.

Depending on the desired final imaged product, it may not be necessary to utilize all captured imagery in constructing the product. For example, a 2D image can be constructed using exclusively trailing edge imagery or exclusively leading edge imagery. In practicality, however, there may exist gaps (holes) in either image set due to imperfect camera positioning and, for this reason, it can be useful to fill the gaps in one image set (e.g., the leading image set) with images selected from the other image set (e.g., the trailing image set). However, analysis of all images collected via the above-described imaging technique can result in high processing times due to the sheer size and quantity of data. For example, it is highly inefficient to stitch together all images sequentially, per the order of the image capture timestamps, because the majority of leading edge images are eventually overwritten completely with trailing edge images—leading to nearly double the image processing time for the "stitching" operations than is actually necessary to stitch together the images of actually appearing in the end product.

Likewise, it is also somewhat inefficient to build an array of leading images, stitch together the leading images, identify holes or gaps in the stitched product, build a new array of trailing edge images that can be used to fill the holes, and the patch the image product. This methodology entails processing steps for identifying where certain holes are steps to patch each individual hole.

In contrast, the herein disclosed 2D composite image creation techniques dramatically reduce this image processing time by providing low-overhead logical operations for selecting a full set of images to be combined into a composite image prior to performing any image stitching (combining of images). Per this methodology, a dominant image set is used (leading or trailing) and holes in the dominant image set are automatically filled without any separate processing operations to identify where the holes are or to retrieve individual images to patch the holes. According to one implementation, the disclosed methodology provides for building a "spatial footprint" of the final composite image product before combining together any images. The spatial footprint of the composite image is defined by the union of spatial footprints of individual images selected from the image set and is, in one implementation, constructed by incrementally expanding a polygon boundary to encompass the spatial footprint of each image in the sequence that is determined to lie at least partially external to the growing spatial footprint. This methodology is discussed in greater detail with respect to FIG. 14-16.

Figure 14:
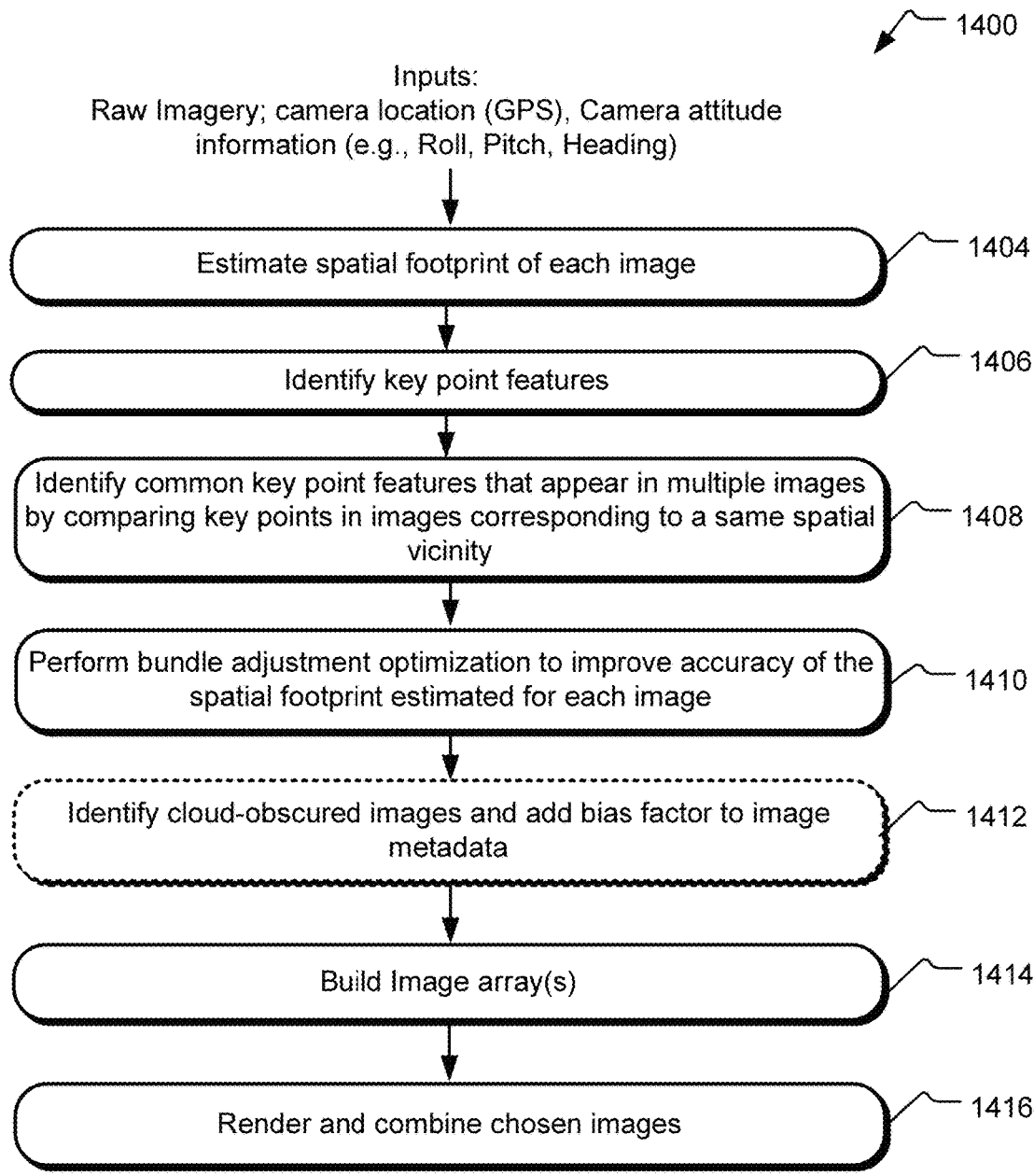
FIG. 14 illustrates low-overhead operations for constructing a 2D composite image from a group of images taken by a camera suspended from a flight vehicle while the camera is rotating along a circular path about a single axis of rotation.

FIG. 14 illustrates low-overhead operations 1400 for constructing a 2D composite image from a group of images taken by a camera suspended from a flight vehicle while the camera is rotating along a circular path about a single axis of rotation (e.g., as generally described with respect to any of FIG. 1-13). In one implementation, the operations 1400 are stored in memory and executed by a processor. The image processing module receives a set of inputs 1402. The set of inputs 1402 includes raw imagery captured by the camera during a single aerial flyover of the flight vehicle as well as camera location information and camera attitude information stored in association with each raw image. The camera location information includes, for example, GPS coordinates collected by an on-board GPS receiver in association with each image, while the camera attitude information includes, for example, heading, pitch, and/or roll data for the camera generated based on other sensor data collected by the imaging system (e.g., by one or more accelerometers, gyroscopes and/or digital compasses such as a magnetometer or dual-GPS compass system).

Using the inputs 1402, a footprint computation operation 1404 estimates a spatial footprint of each individual raw image. As used herein, a "spatial footprint" refers to a closed perimeter (e.g., polygon) corresponding to a defined area on earth's surface. In one implementation, the spatial footprint of an individual image is a quadrilateral defined in terms of latitude and longitude that is estimated by projecting the camera's field-of-view onto a corresponding underlying area of Earth's surface. The projection is, for example, achieved for each image using known techniques that rely on the image's corresponding camera location information and the associated camera attitude information as well as upon other known camera characteristics such as field-of-view angle and focal length.

Following the footprint computation operation 1404, a key point feature identification operation 1406 executes image processing logic to identify "key point" features in each image, where each key point includes a group of pixels characterized by a unique pattern. Key point feature detection is well known in the art and can be achieved by any of a variety of widely available key point detection algorithms.

A key point matching operation 1408 identifies key point features that commonly appear in multiple images by comparing the key points for images in a same spatial vicinity. For example, key points may be compared across images that are known to overlap one another or images that otherwise exist in defined local vicinity, such as a rectangle of set size (e.g., a rectangle 2-3 times the pixel length and width of each individual image). Alternatively, key points are compared to one another when their corresponding coordinates are within a threshold distance of one another. Limiting the key point matching operation 1408 to those key points located within a same defined spatial vicinity has the effect of dramatically reducing image processing as compared to implementations that compare all key points across all images.

A bundle adjustment optimization 1410 refines (adjusts) the estimated spatial footprint(s) of each image to ensure co-location of common key points appearing in different images. For example, an update is performed to the camera attitude information and/or camera location information for each image to "shift" the associated spatial footprint for the image in a manner that ensures the key point feature(s) identified within the image are co-located, in the same coordinate space, with the corresponding (common) key point feature(s) identified in other images. This optimization step is key to improving accuracy of each spatial footprint since flight attitude sensor data is notoriously unreliable (e.g., missing or inaccurate). Thus, while the spatial footprints are initially defined based on camera sensor data, the bundle adjustment optimization operation 1410 redefines the spatial footprints based on actual image data.

An optional biasing operation 1412 identifies and adds a biasing factor to images with cloud cover obscuring underlying terrain. For example, image processing software may analyze each one of the raw images to identify whether the image is partially obscured by cloud cover. As explained elsewhere herein, each area of interest is imaged multiple times-first, while the camera is facing the leading edge of the camera lap and again, at a later time, while the camera is facing the trailing edge of the camera lap. When the flight vehicle is a balloon, the elapsed time between corresponding leading and trailing edge imagery may be on the order of a few hours. Therefore, it is possible for some of the imaged terrain to be obscured by clouds in the leading image set but not in the corresponding trailing image set, and vice versa. As will be appreciated from the following description (e.g., of an array building operation 1414 and operations of FIGS. 15 and 16), the image selection techniques disclosed herein may be optionally biased toward selection of images that are not obscured by clouds. For instance, a 2D composite image may be stitched together primarily by leading-edge images but also include some non-cloud-obscured trailing edge images that geographically correspond to areas captured by select leading images that were entirely or partially cloud-obscured. By adding a biasing factor in the image metadata at the optional biasing operation 1412, these cloud-obscured images can be easily identified at the time of image selection. The optional use of this biasing factor is discussed further with respect to FIG. 15, below.

In another implementation, cloud-obscured images are identified and removed from the image set that is used for all image selection and processing. In this case, cloud-obscured images are simply not available for use in the composite image product.

In still another implementation, the optional biasing operation 1412 is replaced with or followed by an operation that identifies images that are partially cloud-obscured (as compared to completely cloud-obscured). These partially obscured images are cropped such that the resulting image of reduced size does not include the cloud-covered region(s), and the cropped images of smaller size remain available for selection and use in the composite image while the original (un-cropped images) do not remain available for selection.

An array building operation 1414 builds one or more image arrays of the raw images based on metadata stored in association with each image (e.g., spatial footprints and, optionally, the biasing factor). Each of the array(s) constructed by operation 1414 consists of images that are to be combined (stitched together) into a 2D composite image. The array building operation 1414 includes a sequence of low-overhead operations used to select a complete set of images for combination prior to stitching together any two images.

Figure 15:
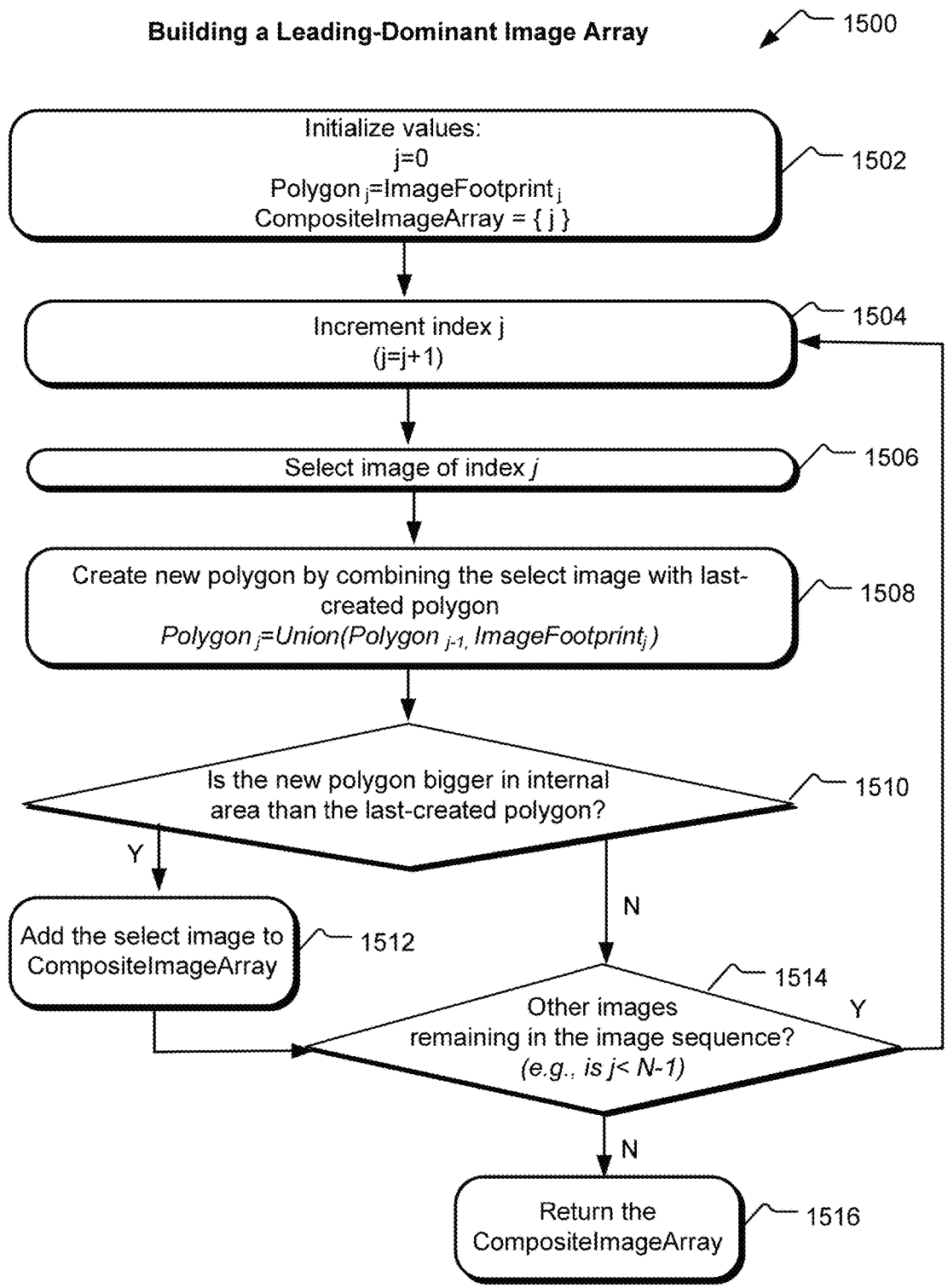
FIG. 15 illustrates example operations for constructing a leading-dominant image array that identifies a complete set of images combinable to form a complete 2D composite image.
Figure 16:
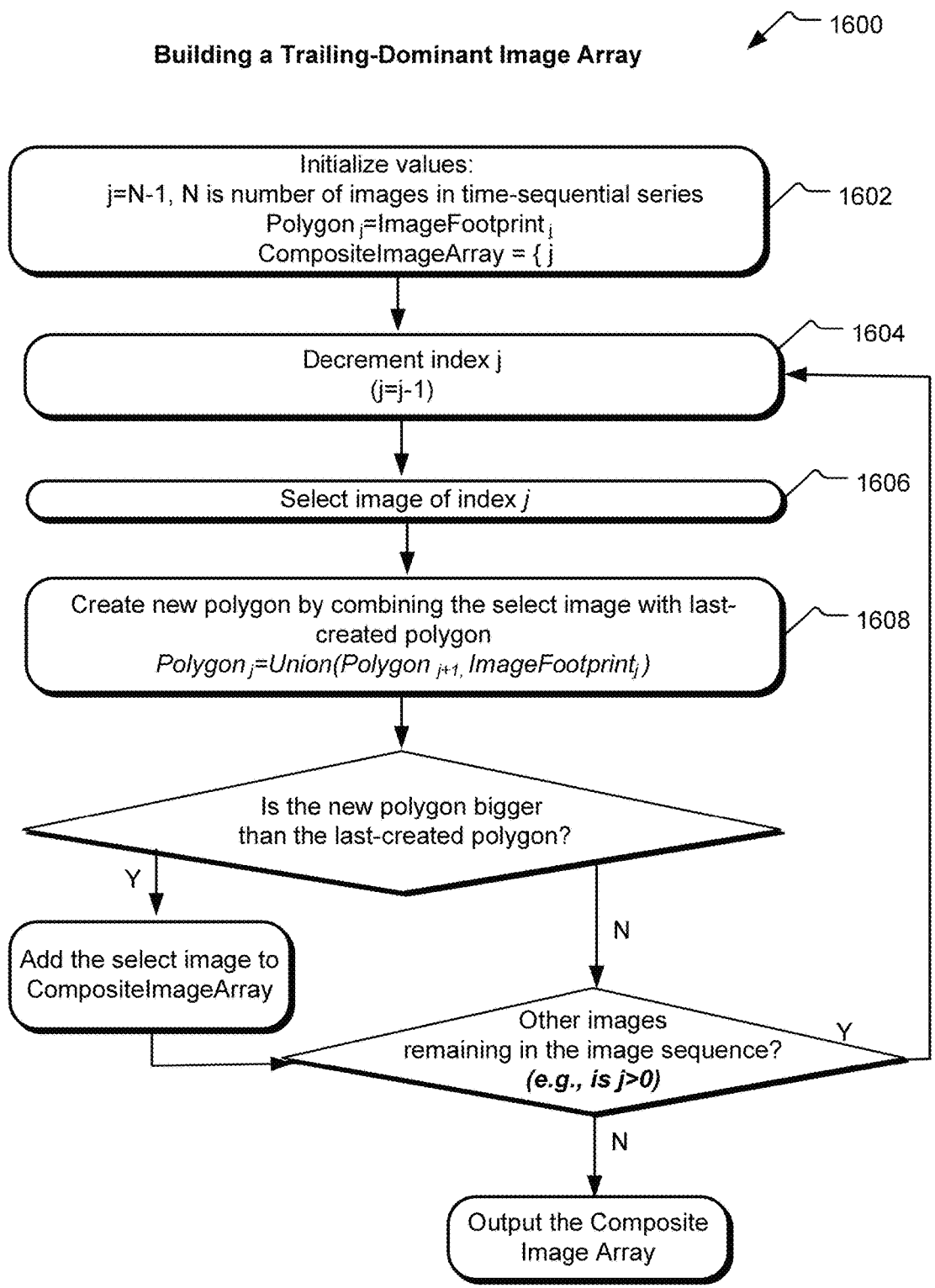
FIG. 16 illustrates example operations for constructing a trailing-dominant image array that identifies a complete set of images combinable to form a complete 2D composite image.

FIG. 15 and FIG. 16 illustrate two different example operation sequences that are usable in the alternative or in combination to implement the array building operation 1414. Notably, these operations provide for defining a composite image set that is primarily "leading dominant" (e.g., comprised mainly of leading images) or "trailing dominant (e.g., comprised mainly of trailing images). The term "dominant" is intended to signify that the final composite image set may include some images selected from the non-dominant image set but primarily images of the dominant image set. For example, the composite image set consists primarily of leading-edge images but also include trailing-edge images corresponding to geographical areas that were, for various reasons, not imaged by the leading image set or obscured by clouds in the leading image set.

Depending upon the desired image product(s), the array building operation 1414 may build one or more arrays. In one implementation, the array building operation 1414 builds a leading-dominant image array per the operations discussed with respect to FIG. 15. In another implementation, the array building operation 1414 builds a trailing-dominant image array per the operations discussed with respect to FIG. 16. In still other implementations, the operations of both FIG. 15 and FIG. 16 are employed to construct two separate image arrays for building two different 2D composite images, such as images that can be combined to create a stereo or 3D image.

A rendering and combination operation 1416 renders and combines the images within each the image array(s) built by operation 1414. If, for example, the array building operation 1414 includes a leading-dominant image array (e.g., consisting of identifiers of each of multiple selected images), the images included within that array are stitched together to produce a final 2D image product.

FIG. 15 illustrates example operations 1500 for constructing a leading-dominant image array that identifies a complete set of images combinable to form a 2D composite image. The images are selected from a group of images collected by an aerial imaging system with features consistent with any of the herein-described implementations.

According to one implementation, the operations 1500 are performed to implement the array building operation 1414 of FIG. 15. The example operations 1500 are low-overhead in the sense that they can be performed without processing raw image data. Consequently, the eventual image processing that is performed to construct a composite image product does not entail stitching together of any images that will not appear in the final product. Additionally, the operations 1500 set forth an elegant selection process that allows gaps in one image set (e.g., leading images) to be automatically filled by corresponding images of the other image set (e.g., trailing images) without processing operations designed to identify the existence of and location of holes that need to be patched.

An initialization operation 1502 initializes a set of variables used to build the leading-dominant image array. Here, an index j is initialized to equal 0, and a first polygon, $Polygon_j$, is initialized to equal the spatial footprint of the image corresponding to index j in a sequence of input images. It is assumed that the sequence of input images are indexed according to a time-consecutive capture sequence. As used herein, "time-consecutive capture sequence" may refer to either a consecutive forward-in-time sequence (e.g., images arranged from earliest timestamp to latest timestamp) or a consecutive backward-in-time sequence (e.g., images arranged from latest timestamp to earliest timestamp). In addition to initializing the index j and $Polygon_j$, the initialization operation also initializes an array of image indices ("CompositeImageArray"). Per the illustrated implementation, the array is initially set to consist of the index of the first image in the input image sequence.

An incrementation operation 1504 increments the index j, and an image selection operation 1506 selects the image positioned at index j within the time-consecutive capture sequence. This image is evaluated, per the operations 1508 and 1510, for potential inclusion in the CompositeImageArray, which is an array that includes identifiers corresponding to images that are to be included in the final composite image product.

A polygon creation operation 1508 defines a new polygon associated with the current index j. This polygon is defined by the union of the last-created polygon ($Polygon_{j-1}$) and the spatial footprint of the image having index j within the time-consecutive sequence ($ImageFootprint_j$). The first time the polygon creation operation 1508 is performed, j−1 is equal to 0, so the constructed polygon, $Polygon_1$, is set to equal the union (e.g., geometrical merger) of $Polygon_0$ (initialized in step 1502 to equal the spatial footprint of the first image in the time-consecutive sequence) and the spatial footprint of the second image in the time-consecutive capture sequence (where j=1). The second time the operation 1508 is performed, another new polygon is defined, $Polygon_2$, which is set to equal the union of $Polygon_1$ and the spatial footprint of the third image in the time-consecutive capture sequence (where j=2). In each repeated operation of operation 1508, the new polygon is created by merging the last-created polygon (j−1) with the spatial footprint the image having the currently-selected image index (j). If the spatial footprint of the selected image is entirely internal to the last-created polygon (j−1), the new polygon (j) is defined to equal the last-created polygon (j−1). If, however, the spatial footprint of the selected image is partially external to the last-created polygon (j−1), the new polygon (j) represents an expansion of the last-created polygon (j−1) that additionally encompasses the area of the spatial footprint for the image at the current index (j).

Following the creation operation 1508, a determination operation 1510 determines whether the spatial footprint of the select image (of index j) is entirely internal to the perimeter of the last-created polygon (j−1), which is (again) a polygon formed based on a union of spatial footprints corresponding to images positioned on a same side of the image within the time-consecutive capture sequence (e.g., images preceding the image within the time-consecutive capture sequence). Stated more simply, the determination operation 1510 determines whether the new polygon, $Polygon_j$, is bigger than the last-created polygon, $Polygon_{j-1}$. If so, an array expansion operation 1512 adds an identifier for the image at the current index (j) to the CompositeImageArray. In the illustrated implementation, the identifier added to the CompositeImageArray is the index (j) of the currently-selected image within the time-consecutive capture sequence. However, in other implementations, other identifiers may be equivalently used. For example, the values in the CompositeImageArray may alternatively be string values corresponding to the filenames for the images. Following this, the flow proceeds to a determination operation 1514, which determines whether other images in remain to be selected in the input image sequence (e.g., yes, provided that j<N−1, where N is the number of images in the sequence).

If, alternatively, the determination operation 1510 determines that the new polygon, $Polygon_j$, is not bigger than the last-created polygon, $Polygon_{j-1}$ (e.g., the two are equal in size because the spatial footprint of the image is entirely internal to the polygon), then the identifier for the selected image is excluded from (i.e., not added to) the CompositeImageArray and the flow proceeds to the determination operation 1514, as described above.

If the determination operation 1514 determines that other images still remain to be selected, the incrementation operation 1504 is repeated, the selection operation 1506 selects the next image corresponding to the incremented index, and the next image is evaluated as for inclusion in the final image product, as generally discussed above.

Once all images have been evaluated (e.g., j is equal to N−1), an output operation 1516 returns the CompositeImageArray, which includes identifiers for all images that are to be combined to create the final composite image.

In a scenario where images are indexed by order of timestamp, earliest-to-latest, the operations 1500 generally provide for selecting and evaluating the leading images before selecting the counterpart trailing images corresponding to the same geographic areas. In general, each leading image has a tendency to expand the previously-defined polygon (e.g., be partially external to it) since the camera is looking forward and partially at a region that has not yet been previously imaged. Consequently, the operations 1500 generally provide for including all leading images in the CompositeImageArray unless the image is subjected to a defined exception, such as a biasing factor, discussed below. In contrast, most trailing images are, at the time of their respective selection (by the selection operation 1506), going to be entirely internal to the last-defined polygon representing the spatial footprint union of previously-evaluated images. Consequently, trailing images are naturally going to be excluded from the CompositeImageArray except in limited scenarios where trailing images have spatial footprints corresponding to terrain not captured by the leading imagery, such as due to imaging errors.

If, for example, the leading imagery includes a gap (e.g., two consecutive spiral-like laps of the camera did not overlap due to a pointing error), then the trailing edge images corresponding to this gap are automatically going to be selected per the disclosed operations because these images will expand on the polygon defined by the union of spatial footprints formed by the previously-evaluated images. Notably, this gap-filing is achieved automatically and without affirmatively searching for or identifying gaps, simply by stepping through each image in the sequence and checking to see if its spatial footprint does or does not expand the polygon defined by the union (merger) of spatial footprints of the previously-evaluated images.

In one implementation, the selection operation 1506 is modified to postpone the selection of certain images based on a biasing factor set in association with the image. For example, images obscured by cloud-cover may be stored in association with a bias factor (e.g., a flag). In this case, the selection operation 1506 may be implemented so as to postpone selection of any images in the sequence with the bias factor until after all other images (without the bias factor) have been evaluated. In this sense, the polygon is gradually expanded by first evaluating spatial footprints of all images that are not obscured by clouds and, subsequently, evaluating the cloud-obscured images per the same logical operations (e.g., to determine whether each cloud-obscured image has a spatial footprint that is partially-external to the last-defined polygon). This methodology serves to bias the operations 1500 toward selecting the images that are not cloud obscured for inclusion in the composite image and while permitting conditional selection of cloud-obscured images in select scenarios where there is no other suitable imagery available.

FIG. 16 illustrates example operations 1600 for constructing a trailing-dominant image array that identifies a complete set of images combinable to create a 2D composite image. These operations are similar to, but slightly different from, the operations described with respect to FIG. 15 for building a leading-dominant image array. According to one implementation, the operations 1600 are performed to implement the array building operation 1414 of FIG. 14.

An initialization operation 1602 initializes a set of variables used to build the trailing-dominant image array. Here, an index j is initialized to equal N−1, where N is the number of images in the time-consecutive capture sequence provided as input to the operations 1600. A first polygon $Polygon_j$ is initialized to equal the spatial footprint of the image corresponding to index j in a sequence of input images, and an array of image indices ("CompositeImage-Array") is initialized to include index j.

A decrementation operation 1604 decrements the index j, and an image selection operation 1606 selects the image positioned at index j within the time-consecutive sequence. This image is evaluated, per the operations 1608 and 1610, for potential inclusion in the array used to construct the final composite image product.

A polygon creation operation 1608 defines a new polygon associated with the current index j. This polygon is defined by the union of the last-created polygon ($Polygon_{j+1}$) and the spatial footprint of the image having index j within the time-consecutive sequence ($ImageFootprint_j$). The first time the operation 1608 is performed, j+1 is equal to the index of the last image in the sequence whereas "j" is equal to the index of the second-to-last image in the sequence. Here, the newly-created polygon ($Polygon_j$) is set to equal the union of the spatial footprints of the last two images in the time-consecutive sequence. The second time the operation 1608 is performed, a new polygon is defined, $Polygon_{j-1}$, which is set to equal the union (e.g., geometrical merger) of the last-created polygon, $Polygon_j$ (e.g., corresponding to the last two images in the sequence) and the spatial footprint of the third-to-last image in the time-consecutive sequence (at index N−3). In each repeated instance of the operation 1608, a new polygon (j) is created by merging the last-created polygon (j+1) with the spatial footprint the image having the currently-selected image index (j).

Following the creation operation 1608, a determination operation 1610 determines whether the spatial footprint of the select image (of index j) is entirely internal to the last-created polygon, which was formed based on a union of spatial footprints corresponding to images positioned on a same side of the image within the time-consecutive capture sequence (e.g., images following the image within the time-consecutive capture sequence). Stated more simply, the determination operation 1610 determines whether the new polygon, $Polygon_j$, is bigger than the last-created polygon, $Polygon_{j+1}$. If so, an array expansion operation adds an identifier for the selected image (e.g., the index (j) of the selected image) to the CompositeImageArray, and the flow proceeds to a determination operation 1614, which evaluates whether other images remain to be selected in the input image sequence (e.g., yes, provided that j>0).

If, alternatively, the determination operation 1610 determines that the new polygon, $Polygon_j$, is not bigger than the last-created polygon, $Polygon_{j+1}$, the identifier of the selected image is not added to the CompositeImageArray and the flow proceeds to the determination operation 1614, as described above.

If the determination operation 1614 determines that other images still remain to be selected, the decrementing operation 1604 is repeated, the selection operation 1606 selects the next image corresponding to the decremented index, and the next image is evaluated for inclusion in the final composite image product, as generally discussed above. Once all images have been evaluated (e.g., j=0), an output operation 1616 returns the CompositeImageArray, which includes indices of all images that are to be combined to create the final composite image.

In one implementation, the image selection process implemented performs both the operations 1500 of FIG. 15 and the operations 1600 of FIG. 16. Consequently, a first composite image array is generated of leading-dominant images while a second composite image array is generated of trailing-dominant images. In this case, the first composite image array is used to generate a first composite image that is leading-dominant while the second composite image array is used to generate a second composite image that is trailing-dominant. This corresponds, generally, to view 1310 in FIG. 13 showing a set of trailing imagery and leading imagery that would, in the "leading-dominant/trailing-dominant" case, be modified to include select photos from the non-dominant image set (e.g., to fill gaps). Due to the lapse of time between capture of the leading imagery and corresponding trailing imagery, it is possible that features imaged redundantly in each set have changed in position or form. In one implementation, further image processing operations are automatically performed to compare the first composite image to the second composite image and determine based on the comparison, determine whether an object of interest has changed in form or location. If so, a change event is automatically recorded in a data product (e.g., logfile) provided to a customer or system administrator.

In another implementation, the first composite image and the second composite image are combined to generate a 3D or stereo image.

In still another implementation, the first composite image and the second composite image are assessed for quality and a higher quality image is selected for retention (e.g., to provide to a customer). The non-selected composite image is deleted, freeing up storage resources. Image quality may, in this case, be measured by one or more objectively measurable image characteristics such as brightness, contrast, blur, etc.

Figure 17:
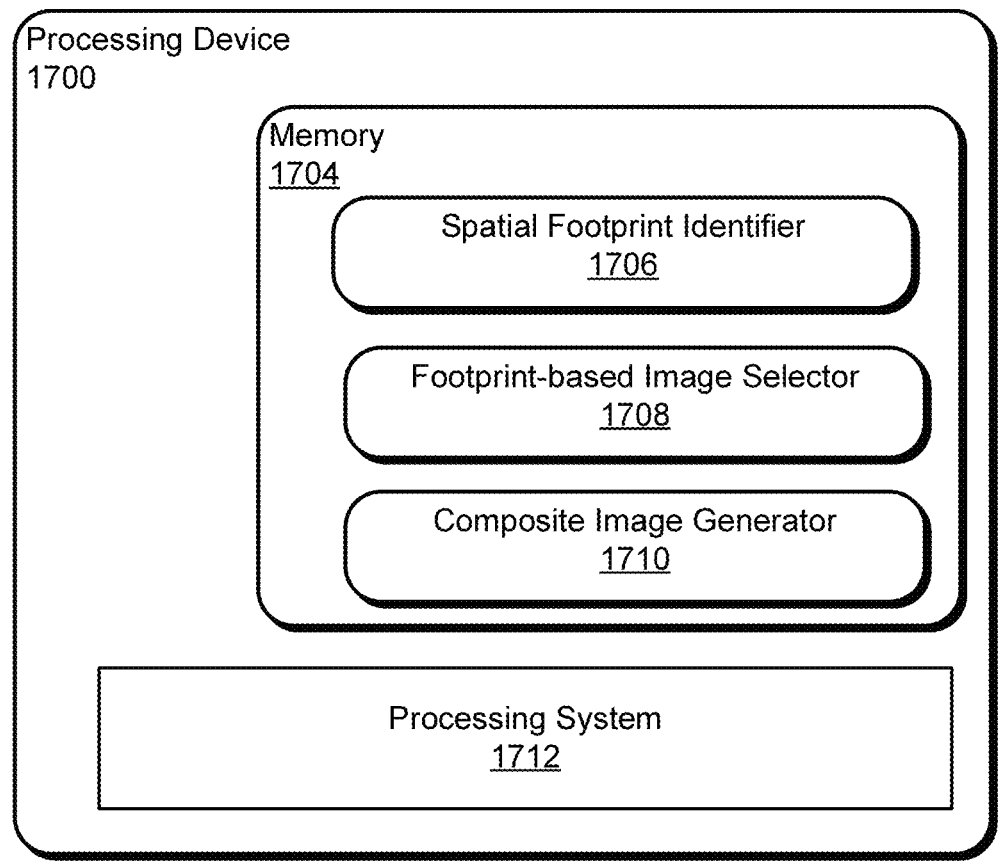
FIG. 17 illustrates a processing device 1700 suitable for implementing aspects of the disclosed technology.

FIG. 17 illustrates a processing device 1700 suitable for implementing aspects of the disclosed technology. The processing device 1700 includes a processing system 1712 and memory 1704. The memory 1704 may store an operating system (not shown) as well as various applications that are executable on the operating system and by the processing unit(s) 702. In FIG. 17, the memory 1704 is shown as storing three example image processing applications-a spatial footprint identifier 1706, a footprint-based image selector 1708, and a composite image generator 1710. Each of these applications performs operations described with respect to one or more of FIG. 14-16, which are referenced below.

The spatial footprint identifier 1706 generates an estimate of a spatial footprint for each image using various inputs, such as camera location information and camera attitude information (e.g., the camera's roll, pitch, and heading angle) collected in association with each image (e.g., as generally with respect to FIG. 14, footprint computation operation 1404). In one implementation, the spatial footprint identifier 1706 executes a key point identification algorithm to identify key points in each image and logic to match common key points across different images (e.g., as generally described with respect to FIG. 14, operations 1406-1408). Using the identified common key points, the spatial footprint identifier performs a bundle adjustment optimization to improve accuracy of the spatial footprints. The bundle adjustment optimization effectively shifts the estimated spatial footprints to ensure co-location of the common key points appearing in multiple images according to a solution that minimizes error across the full set of images (e.g., as also described with respect to FIG. 14, bundle adjustment optimization operation 1410). In one implementation, the spatial footprint identifier 1706 identifies select images that are obscured by clouds and adds a biasing factor to the metadata associated with each image (e.g., as generally described with respect to FIG. 14, operations 1412).

The adjusted spatial footprints for each image are provided to a footprint-based image selector 1708, which performs selection operations consistent with those shown and discussed in FIG. 15 and/or FIG. 16. The footprint-based image selector 1708 outputs a composite image array that includes identifiers for all images that are to be combined (stitched together) to create an composite image product. A composite image generator 1710 receives the composite image array output by the footprint-based image selector 1708 and generates the composite image by stitching together and rendering the images identified within the composite image array.

Although FIG. 17 illustrates the spatial footprint identifier 1706, footprint-based image selector 1708, and composite image generator 1710 as all being stored within and executed by a same processing device 1700, some implementations may implement the functionality of these respective applications in different processing devices. For example, the imaging system on-board the flight vehicle may implement functionality of the spatial footprint identifier 1706 and footprint-based image selector 1708, while a ground-based processing device implements functionality of the composite image generator 1710. Performing image selection on-board the flight vehicle may allow for dynamic deletion of images that are not to be included to the generated composite image, freeing up on-board storage space. Likewise, delegating the actual creation of the composite image to a ground-based processing device serves to conserve in-flight processing resources and may allow for quicker image processing since the ground-based processing system may be more powerful than that included on the flight vehicle (given very tight size and weight regulations of stratospheric flight vehicles).

In general, the processing device 1700 may include a variety of tangible computer-readable storage media and intangible computer-readable communication signals. Tangible computer-readable storage can be embodied by any available media that can be accessed by the processing device 1700 and includes both volatile and nonvolatile storage media, removable and non-removable storage media. Tangible computer-readable storage media excludes intangible and transitory communications signals and includes volatile and nonvolatile, removable and non-removable storage media implemented in any method or technology for storage of information such as computer readable instructions, data structures, program modules or other data. In contrast to tangible computer-readable storage media, intangible computer-readable communication signals may embody computer readable instructions, data structures, program modules or other data resident in a modulated data signal, such as a carrier wave or other signal transport mechanism.

The above specification, examples, and data provide a complete description of the structure and use of exemplary embodiments of the disclosed technology. Since many embodiments of the disclosed technology can be made without departing from the spirit and scope of the disclosed technology, the disclosed technology resides in the claims hereinafter appended. Furthermore, structural features of the different embodiments may be combined in yet another embodiment without departing from the recited claims.

What is claimed is:

1. A method of creating a composite image from images taken by a camera while the camera is moving laterally and rotating along a circular path about a single axis of rotation, the method comprising:
   receiving a group of images indexed according to a time-consecutive capture sequence;
   evaluating each image in the group for inclusion in the composite image, the evaluation of each image including:
      determining whether a spatial footprint of the image is entirely internal to a polygon formed based on a union of spatial footprints corresponding to images positioned on a same side of the image within the time-consecutive capture sequence; and
      responsive to determining that the image is not entirely internal to the polygon, adding an identifier for the image to a composite image array; and
   creating the composite image by stitching together images having identifiers included in the composite image array.

2. The method of claim 1, further comprising:
   excluding the image from the composite image array responsive to determining that the spatial footprint of the image is entirely internal to the polygon.

3. The method of claim 1, further comprising:
computing the spatial footprint for each image in the group based on camera location information and camera attitude information stored in association with the image; and
refining the spatial footprint computed for each image based on an identification of key points that commonly appear in multiple images of the group.

4. The method of claim 1, further comprising:
identifying cloud-obscured images within the group;
adding a bias factor to each of the cloud-obscured images, wherein evaluating each image of the group for potential inclusion in the composite image array includes:
evaluating the images of the group that do not include the bias factor for potential inclusion in the composite image array before evaluating the images that include the bias factor.

5. The method of claim 1, further comprising:
identifying, partially-cloud-obscured images in the group, the partially-cloud-obscured images including terrain partially obscured by cloud cover;
cropping each of the partially-cloud-obscured images to remove the cloud cover.

6. The method of claim 1, wherein the composite image array is a first composite image array wherein the evaluation of each of the images further comprises:
adding an identifier of the image to the first composite image array responsive to determining that the spatial footprint of the image is not entirely internal to a polygon formed based on a union of spatial footprints corresponding to images captured earlier in time than the image within the group;
adding an identifier of the image to a second composite image array responsive to determining that the spatial footprint of the image is not entirely internal to a polygon formed based on a union of spatial footprints corresponding to images captured later in time than the image within the group.

7. The method of claim 6, further comprising:
creating a first composite image from images with corresponding identifiers included within first composite image array; and
creating a second composite image from images with corresponding identifiers included in the second composite image array.

8. The method of claim 7, further comprising:
determining, based on a comparison of the first composite image and the second composite image, whether an object of interest has changed in form or location in the time elapsed between imaging of the object with leading and trailing images of the camera; and
in response to determining that the object has changed in form or location, recording a change event in a data product.

9. The method of claim 6, further comprising: wherein the group of images are all captured during a same aerial flyover by a flight vehicle above a geographical area of interest and the method further comprises creating a stereo image or a 3D image from the group of the images.

10. One or more tangible computer-readable storage media encoding computer-executable instructions for executing a computer process for generating a composite image from images taken by a camera while the camera is moving laterally and rotating along a circular path about a single axis of rotation, the computer process comprising:
sequentially selecting each image in a group of images captured by the camera, the group of images being indexed according to a time-consecutive capture sequence and, for each image:
adding an identifier of the image to a composite image array in response to determining that a spatial footprint of the image is entirely internal to a polygon formed based on a union of spatial footprints corresponding to images positioned on a same side of the image within the time-consecutive capture sequence; and
excluding the identifier of the image from the composite image array in response to determining that the spatial footprint of the image is not entirely internal to a polygon formed based on a union of spatial footprints corresponding to images positioned on a same side of the image within the time-consecutive capture sequence; and
stitching together the images with respective identifiers included within the composite image array.

11. The one or more tangible computer-readable storage media of claim 10, wherein the computer process further comprises:
computing the spatial footprint for each image in the group based on camera location information and camera attitude information stored in association with the image; and
refining the spatial footprint computed for each image based on an identification of key points that commonly appear in multiple images of the group.

12. The one or more tangible computer-readable storage media of claim 10, wherein the computer process further comprises:
identifying cloud-obscured images within the group of images;
adding a bias factor to each of the cloud-obscured images, wherein images of the group that do not include the bias factor are selectively added to or excluded from the composite image array prior to the selection of any of the images that include the bias factor.

13. The one or more tangible computer-readable storage media of claim 10, wherein the computer process further comprises:
Identifying partially-cloud-obscured images in the group, the partially-cloud-obscured images depicting terrain partially obscured by cloud cover;
cropping each of the partially-cloud-obscured images to remove the cloud cover.

14. The one or more tangible computer-readable storage media of claim 10, wherein the composite image array is a first composite image array and the computer-executable instructions further include:
adding the index of the select image to the first composite image array responsive to determining that the spatial footprint of the select image is not entirely internal to a polygon formed based on a union of spatial footprints corresponding to images captured earlier in time than the select image within the group;
adding the index of the select image to a second composite image array responsive to determining that the spatial footprint of the select image is not entirely internal to a polygon formed based on a union of spatial footprints corresponding to images captured later in time than the image within the group;
creating a first composite image from images with corresponding identifiers included within the first composite image array; and creating a second composite images from images with corresponding identifiers included in the second composite image array.

15. The one or more tangible computer-readable storage media of claim 14, wherein the computer process further comprises:
determining, based on a comparison of the first composite image and the second composite image, whether an object of interest has changed in form or location in the time elapsed between imaging of the object with leading and trailing images of the camera; and
in response to determining that the object has changed in form or location, recording a change event in a data product.

16. The one or more tangible computer-readable storage media of claim 10, wherein the computer process further comprises:
Generating a stereo or 3D image from the group of images, the group of images being collected during a single aerial flyover of a flight vehicle.

17. A system comprising:
a processing system;
memory;
a footprint-based image selector stored in the memory and executable by the processing system to:
receive a group of images indexed according to a time-consecutive capture sequence;
evaluate each image in the group for inclusion in a composite image, the evaluation of each image including:
determining whether a spatial footprint of the image is entirely internal to a polygon formed based on a union of spatial footprints corresponding to images positioned on a same side of the image within the time-consecutive capture sequence; and
responsive to determining that the image is not entirely internal to the polygon, add an identifier for the image to a composite image array; and
a composite image generator stored in the memory and executable by the processing system to:
create the composite image by stitching together images having identifiers included within the composite image array.

18. The system of claim 17, wherein the footprint based image selector is further configured to exclude the image from the composite image array responsive to determining that the spatial footprint of the image is entirely internal to the polygon.

19. The system of claim 17, further comprising:
a spatial footprint identifier stored in the memory and executable to:
compute a spatial footprint for each image in the group based on camera location information and camera attitude information stored in association with the image; and
refine the spatial footprint computed for each image based on an identification of key points that commonly appear in multiple images of the group.

20. The system of claim 19, wherein the spatial footprint identifier is further configured to:
identify cloud-obscured images within the group and add a bias factor to each of the cloud-obscured images, and wherein the footprint-based image selector is further configured to evaluating the images of the group that do not include the bias factor for potential inclusion in the composite image array before evaluating the images that include the bias factor.

* * * * *